United States Patent
Lu et al.

(10) Patent No.: US 12,542,509 B2
(45) Date of Patent: Feb. 3, 2026

(54) MOTOR DRIVING APPARATUS, MOTOR SYSTEM, AND ELECTRIC VEHICLE

(71) Applicant: Huawei Digital Power Technologies Co., Ltd., Shenzhen (CN)

(72) Inventors: Chunhong Lu, Xi'an (CN); Jie Tang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 151 days.

(21) Appl. No.: 18/496,625

(22) Filed: Oct. 27, 2023

(65) Prior Publication Data
US 2024/0063747 A1 Feb. 22, 2024

Related U.S. Application Data

(63) Continuation of application No. PCT/CN2021/091454, filed on Apr. 30, 2021.

(51) Int. Cl.
*H02M 3/04* (2006.01)
*B60L 15/02* (2006.01)
*B60L 15/20* (2006.01)
*H02P 27/14* (2006.01)

(52) U.S. Cl.
CPC ............ *H02P 27/14* (2013.01); *B60L 15/02* (2013.01); *B60L 15/2045* (2013.01)

(58) Field of Classification Search
CPC . H02P 27/14; H02M 7/4833; H02M 7/53876; H02M 7/5395; H02M 7/487
See application file for complete search history.

(56) References Cited

U.S. PATENT DOCUMENTS

| 5,517,401 A | 5/1996 | Kinoshita et al. |
| 6,337,804 B1* | 1/2002 | Kea ........................ H02M 7/487 363/132 |
| 2006/0197491 A1* | 9/2006 | Nojima ................. H02M 7/487 318/801 |

(Continued)

FOREIGN PATENT DOCUMENTS

| CN | 101018017 A | 8/2007 |
| CN | 101494424 A | 7/2009 |

(Continued)

*Primary Examiner* — Muhammad S Islam
(74) *Attorney, Agent, or Firm* — Leydig, Voit & Mayer, Ltd.

(57) ABSTRACT

A motor driving apparatus, a motor system, and an electric vehicle are described that improve running efficiency of a motor and avoid damaging an inverter. The motor driving apparatus includes a three-level inverter, a motor parameter obtaining circuit, and a control circuit. The three-level inverter is configured to invert a direct current provided by the first power supply into an alternating current, and provide the alternating current for the motor; the motor parameter obtaining circuit is configured to be separately coupled to the motor and the control circuit, and is configured to: obtain a motor working condition signal of the motor, and provide the motor working condition signal for the control circuit; and the control circuit is configured to control the three-level inverter in the target working mode so that a midpoint voltage of the three-level inverter is less than a first voltage threshold.

21 Claims, 18 Drawing Sheets

(56) References Cited

U.S. PATENT DOCUMENTS

2014/0376287 A1* 12/2014 Narimani ................ H02M 3/07
                   363/60
2015/0200602 A1* 7/2015 Narimani ............ H02M 5/4585
                   363/37
2018/0294741 A1* 10/2018 Mondal ................... H02J 9/061

FOREIGN PATENT DOCUMENTS

| CN | 103368433 A | 10/2013 |
|----|-------------|---------|
| EP | 2693627 A2 | 2/2014 |
| EP | 3627677 A1 | 3/2020 |
| JP | H09191657 A | 7/1997 |
| KR | 20180103238 A | 9/2018 |

* cited by examiner (a)

(b)

MOTOR DRIVING APPARATUS, MOTOR SYSTEM, AND ELECTRIC VEHICLE

CROSS-REFERENCE TO RELATED APPLICATIONS

This application is a continuation of International Application No. PCT/CN2021/091454, filed on Apr. 30, 2021, the disclosure of which is hereby incorporated by reference in its entirety.

TECHNICAL FIELD

This application relates to the field of electronic technologies, and in particular, to a motor driving apparatus, a motor system, and an electric vehicle.

BACKGROUND

Currently, a three-phase full-bridge inverter is usually used to drive a motor. The three-phase full-bridge inverter may output voltages at only two levels, and a harmonic of an output voltage and a harmonic of an output current are high, increasing a motor loss. In addition, when the motor works in a small torque area, power is small, a switching loss accounts for a large proportion, and inverter efficiency is low.

Because the harmonic of the output voltage and the harmonic of the output current of the three-phase full-bridge inverter are high, a torque pulse of the motor is large, and noise becomes larger. Therefore, a three-level inverter is proposed in this field, for example, a T-type three-level inverter and an I-type three-level inverter. Compared with the three-phase full-bridge inverter, the three-level inverter outputs a current with a low harmonic, to improve running efficiency of the motor. In an actual application scenario, the three-level inverter has an inherent problem that a midpoint voltage fluctuates. In an existing three-level inverter control solution, the midpoint voltage fluctuates especially prominently in cases of a low output frequency, a low power factor, and a large current working condition. If the midpoint voltage fluctuates too much, the output current is distorted, and the torque pulse is too large. In an extreme working condition, a switch in the inverter may be damaged, and the running efficiency of the motor is reduced.

SUMMARY

This application provides a motor driving apparatus, a motor system, and an electric vehicle, to improve running efficiency of a motor and avoid damaging an inverter.

According to a first aspect, this application provides a motor driving apparatus, including a three-level inverter, a motor parameter obtaining circuit, and a control circuit. The three-level inverter is configured to be separately connected to a first power supply and a motor, to invert a direct current provided by the first power supply into an alternating current, and provide the alternating current for the motor; the motor parameter obtaining circuit is configured to be separately coupled to the motor and the control circuit, and is configured to: obtain a motor working condition signal of the motor, and provide the motor working condition signal for the control circuit; and the control circuit is configured to: select a target working mode from a plurality of working modes based on the motor working condition signal, and control the three-level inverter in the target working mode, so that a midpoint voltage of the three-level inverter is less than a first voltage threshold.

In this embodiment of this application, the motor working condition signal of the motor may reflect a working condition of the motor. The control circuit may select, from the plurality of working modes based on the motor working condition signal, a working mode suitable for a current working condition of the motor, and control the three-level inverter to improve running efficiency of the motor. In addition, in a process of controlling the three-level inverter, the midpoint voltage of the three-level inverter may be less than the first voltage threshold, to avoid a fluctuation in the midpoint voltage, avoid damaging the three-level inverter, and improve overall running efficiency of the motor.

In a possible design, the plurality of working modes include at least a first working mode and a second working mode; and when selecting the target working mode from the plurality of working modes based on the motor working condition signal, the control circuit is specifically configured to: compare the motor working condition signal and a reference signal threshold; determine the second working mode as the target working mode if the motor working condition signal is less than the reference signal threshold; and determine the first working mode as the target working mode if the motor working condition signal is greater than or equal to the reference signal threshold.

In this embodiment of this application, the control circuit may determine the working condition of the motor based on a value relationship between the motor working condition signal and the reference signal threshold. For example, a torque area in which the motor works when the motor working condition signal is greater than the reference signal threshold is different from a torque area in which the motor works when the motor working condition signal is less than or equal to the reference signal threshold. When the motor works in different torque areas, the control circuit may control the three-level inverter in different working modes, to improve running efficiency of the motor in each torque area.

In a possible design, the reference signal threshold is one of a first preset signal threshold and a second preset signal threshold, the first preset signal threshold is greater than the second preset signal threshold, and a difference between the first preset signal threshold and the second preset signal threshold is a preset value; and the control circuit is further configured to: if a target working mode determined at a current time is the first working mode, use the second preset signal threshold as a reference signal threshold for a next comparison with the motor working condition signal obtained by the motor parameter obtaining circuit; or if a target working mode determined at a current time is the second working mode, use the first preset signal threshold as a reference signal threshold for a next comparison with the motor working condition signal obtained by the motor parameter obtaining circuit.

In this embodiment of this application, after determining the target working mode, the control circuit may determine, based on the target working mode determined at the current time, the reference signal threshold used for a next comparison with the obtained motor working condition signal. The first preset signal threshold is greater than the second preset signal threshold, and the difference between the first preset signal threshold and the second preset signal threshold is the preset value. In other words, hysteresis is the preset value. Such a design may reduce a quantity of times that the control circuit switches a working mode, to avoid frequent switching.

In a possible design, the motor driving apparatus may include a capacitor voltage detection circuit. The capacitor voltage detection circuit is separately connected to the three-level inverter and the control circuit; the three-level inverter includes a first input port, a second input port, and two voltage division capacitors, the first input port and the second input port are respectively configured to be connected to a positive port and a negative port of the first power supply, and the two voltage division capacitors are connected in series between the first input port and the second input port; the capacitor voltage detection circuit is configured to: detect a voltage of each voltage division capacitor, and provide voltages of the two voltage division capacitors for the control circuit; and the control circuit is further configured to: if a previously determined target working mode is the second working mode and the target working mode determined at the current time is the first working mode, control the three-level inverter in the first working mode after it is determined that a difference between the voltages of the two voltage division capacitors is less than a second voltage threshold, where the second voltage threshold is less than the first voltage threshold.

In this embodiment of this application, the control circuit may control the three-level inverter in the first working mode when the difference between the voltages of the two voltage division capacitors is less than the second voltage threshold, so that the midpoint voltage of the three-level inverter can be the second voltage threshold, to avoid the fluctuation in the midpoint voltage of the three-level inverter, and avoid damaging the inverter due to the fluctuation in the midpoint voltage. For example, the second voltage threshold may be a value close to zero.

In a possible design, the three-level inverter further includes a plurality of branches, each branch is connected to an input port of one phase of the motor, different branches are connected to different input ports of the motor, and the control circuit is connected to each branch; and if the target working mode is the first working mode, when controlling the three-level inverter in the target working mode, the control circuit is specifically configured to: determine at least one basic voltage vector from a plurality of basic voltage vectors based on a reference voltage vector, and determine an action time period corresponding to each determined basic voltage vector in a period, where the reference voltage vector is determined based on an expected current value of the motor and an output current value of the motor, the basic voltage vector includes expected output voltage information of each branch, the expected output voltage information is determined based on a voltage of the first power supply, and a voltage corresponding to the expected output voltage information is not zero; determine, based on each determined basic voltage vector, the expected output voltage information corresponding to each branch in the action time period corresponding to each determined basic voltage vector; and control the branch to provide, for the connected input port of one phase of the motor in the action time period of each determined basic voltage vector in the period, a voltage corresponding to the expected output voltage information corresponding to the branch.

In this embodiment of this application, in a process in which the control circuit controls the three-level inverter in the first working mode, a voltage corresponding to expected output voltage information of each branch in a used basic voltage vector is not zero, so that an output voltage of each branch in the three-level inverter is not zero. When an output voltage of a branch is not zero, an output port of the branch is connected to a midpoint between the two voltage division capacitors. Therefore, the midpoint voltage of the three-level inverter does not fluctuate.

In a possible design, each branch includes a first switch K1, a second switch K4, a third switch K3, and a fourth switch K2, the first switch K1 and the second switch K4 are connected in series between the first input port and the second input port, the third switch K3 and the fourth switch K2 are connected in series between a first node and a second node, the first node is a connection point between the first switch K1 and the second switch K4, the second node is a connection point between the third switch K3 and the fourth switch K2, the first node is an output port of the branch and is configured to be connected to the input port of one phase of the motor, different branches are connected to different input ports of the motor, and the control circuit is connected to each switch included in each branch; and if the target working mode is the first working mode, when the control circuit controls the three-level inverter in the target working mode, the third switch K3 and the fourth switch K2 are in an off state.

In this embodiment of this application, the three-level inverter may be a T-type inverter. In a process in which the control circuit controls the three-level inverter in the first working mode, the control circuit may control two switches between an output port of each branch and the midpoint between the two voltage division capacitors to be in an off state, to reduce a quantity of times of switching the two switches, and reduce a switching loss.

In a possible design, if the target working mode is the first working mode, an output port of each branch is not connected to a connection point between the two voltage division capacitors when the three-level inverter is in the first working mode; and if the target working mode is the second working mode, a voltage output by the output port of each branch when the three-level inverter is in the second working mode is one of three preset voltages, the three preset voltages are a first voltage +Vdc/2, a second voltage −Vdc/2, and 0, and Vdc is a voltage of the first power supply.

In this embodiment of this application, the control circuit controls the three-level inverter in the first working mode, so that the midpoint voltage of the three-level inverter is stabilized, to avoid damaging a switch due to the fluctuation in the midpoint voltage. The control circuit controls the three-level inverter in the second working mode. The three-level inverter may provide, for the motor, an alternating current including three levels. A voltage waveform may be close to an ideal sine wave, to improve the running efficiency of the motor.

In a possible design, the motor driving apparatus further includes a power supply voltage detection circuit. The power supply voltage detection circuit is configured to: be connected to the first power supply, and be connected to the control circuit, and is configured to: detect the voltage Vdc of the first power supply, and provide the voltage Vdc of the first power supply for the control circuit, so that the control circuit determines the expected output voltage information of each branch. In this embodiment of this application, the expected voltage information of each branch is determined based on the voltage Vdc of the first power supply. For example, when the control circuit controls the three-level inverter in the first working mode, a voltage corresponding to the expected voltage information of each branch in the three-level inverter may be +Vdc/2 or −Vdc/2. When the control circuit controls the three-level inverter in the second working mode, a voltage corresponding to the expected voltage information of each branch in the three-level inverter may be +Vdc/2, −Vdc/2, or 0.

In a possible design, the motor working condition signal is a current at an input port of one or more phases of the motor; and the motor parameter obtaining circuit includes a current collection circuit, and the current collection circuit is configured to be connected to the input port of one or more phases of the motor, and is configured to collect the current at the input port of one or more phases of the motor. In this embodiment of this application, the control circuit may determine a working mode based on a relationship between the current at the input port of one or more phases of the motor and a reference current threshold.

In a possible design, the motor working condition signal is a torque parameter of the motor; and the motor parameter obtaining circuit includes an instruction receiving circuit, the instruction receiving circuit is configured to receive a motor torque instruction, and the motor torque instruction carries the torque parameter of the motor. In this embodiment of this application, the control circuit may determine a working mode based on a relationship between the torque parameter of the motor and a reference torque threshold.

According to a second aspect, this application provides a motor system, including the motor driving apparatus, the first power supply, and the motor according to any one of the first aspect and the possible designs of the first aspect. The motor driving apparatus is separately connected to the first power supply and the motor, and is configured to: convert a direct current provided by the first power supply into an alternating current, and provide the alternating current for the motor.

According to a third aspect, this application provides an electric vehicle, including the motor system according to the second aspect.

For a technical effect that can be achieved by any possible design of the second aspect and the third aspect, refer to descriptions of a technical effect that can be achieved by any possible design of the first aspect. Details are not described herein again.

DESCRIPTION OF EMBODIMENTS

An endurance mileage is one of key indicators of an electric vehicle. Comprehensive efficiency of a motor and a motor control unit (MCU) is a key factor in determining the endurance mileage of the electric vehicle. Most of new European driving cycle (NEDC) working points of the electric vehicle are concentrated in a small torque area. Efficiency of a motor and an MCU working at the NEDC working point affects the endurance mileage of the electric vehicle.

Currently, a topology of the MCU of the electric vehicle is usually a structure of a three-phase full-bridge inverter, and a modulation mode is usually space vector pulse width modulation (SVPWM). System efficiency of a system including a motor and a controller is low in the small torque area of the motor. When a torque is less than 25 Nm, the system efficiency is below 90%; and when the torque is approximately 5 Nm, the system efficiency is lower, and is approximately 80%. System efficiency of the electric vehicle in an NEDC region is improved, to effectively improve the endurance mileage of the electric vehicle, and is of great significance to driving of the motor of the electric vehicle.

Figure 1:
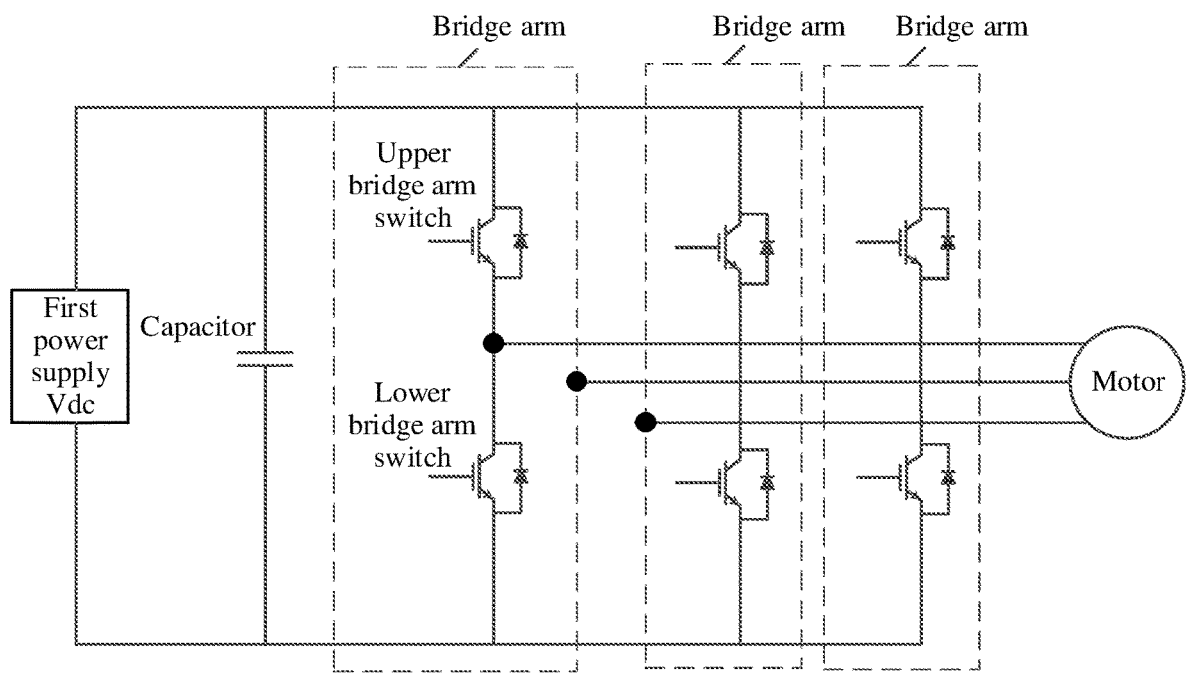
FIG. 1 is a schematic diagram of a structure of a three-phase full-bridge inverter.
Figure 2:
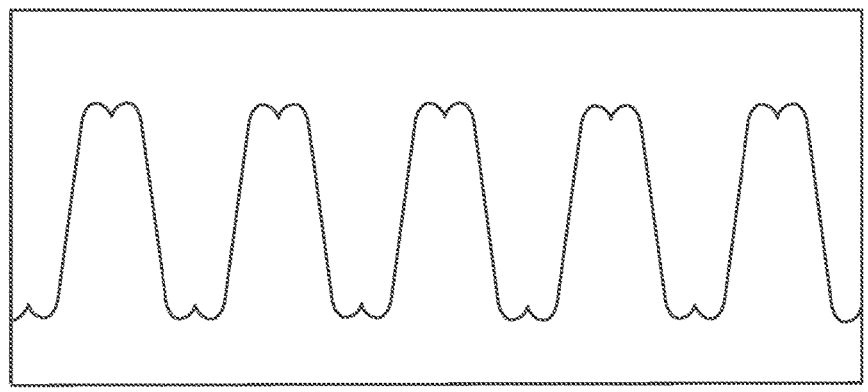
FIG. 2 is a schematic diagram of a modulation wave of a bridge arm of a three-phase full-bridge inverter.

As shown in FIG. 1, a three-phase full-bridge inverter includes a capacitor and three bridge arms connected in parallel. Each bridge arm includes two switches, and the two switches are recorded as an upper bridge arm switch and a lower bridge arm switch. Each upper bridge arm switch is connected to a first electrode of the capacitor, and each lower bridge arm switch is connected to a second electrode of the capacitor. In each bridge arm, a connection point between the upper bridge arm switch and the lower bridge arm switch is used as an output port. An output port of a bridge arm may be connected to an input port of one phase of a motor, and the bridge arm may also be referred to as a bridge arm corresponding to one phase. A modulation wave of each phase of the three-phase full-bridge inverter is shown in FIG. 2. After modulation is performed based on the modulation wave of each phase, a drive signal of each switch of each bridge arm may be generated. After the generated drive signal of each switch is applied to the switch, an output voltage of the three-phase full-bridge inverter may include two levels.

A controller controls each switch of each bridge arm, so that the inverter converts, into an alternating current, a direct current provided by a power supply Vdc. In a process in which the controller controls the inverter, for two switches of each bridge arm, at a same moment, one switch is in an on state, and the other switch is in an off state. In a bridge arm, when an upper bridge arm switch is in an on state and a lower bridge arm switch is in an off state, a state of the bridge arm is recorded as a state "1", and an output voltage is +Vdc. When the upper bridge arm switch is in an off state and the lower bridge arm switch is in an on state, a state of the bridge arm is recorded as a state "0", and an output voltage is 0. It can be learned that the three-phase full-bridge inverter may output voltages at two levels when working.

In an application process, the three-phase full-bridge inverter may output voltages at only two levels, and a harmonic of an output voltage and a harmonic of an output current are high, increasing a motor loss. In addition, when the motor works in a small torque area, power is small, a switching loss accounts for a large proportion, and inverter efficiency is low.

Because the harmonic of the output voltage and the harmonic of the output current of the three-phase full-bridge inverter are high, a torque pulse of the motor is large, and noise becomes larger. Therefore, a three-level inverter is proposed in this field, for example, a T-type three-level inverter and an I-type three-level inverter. The output voltage of the three-level inverter may include three levels, and an output voltage waveform is closer to an ideal sine wave. Compared with a three-phase full-bridge inverter, the three-level inverter outputs a current with a low harmonic, to improve running efficiency of the motor, and improve efficiency of an MCU.

Figure 3:
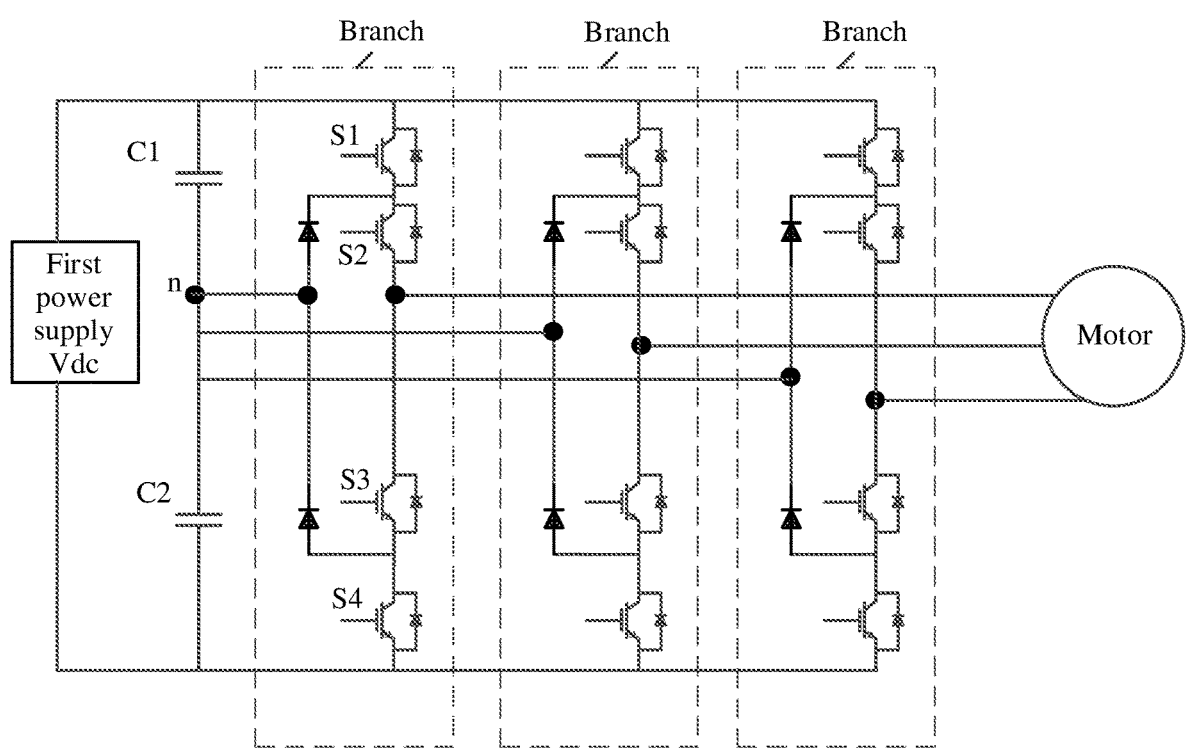
FIG. 3 is a schematic diagram of a structure of a three-level inverter.

First, a neutral point clamped I-type three-level inverter is introduced. FIG. 3 is a schematic diagram of a structure of a neutral point clamped I-type three-level inverter. The neutral point clamped I-type three-level inverter is denoted as an I-type inverter 400 for ease of description. The I-type inverter 400 may include two voltage division capacitors (denoted as C1 and C2) and three branches. The two voltage division capacitors are connected in series, and capacitor parameters are the same. The I-type inverter 400 may be connected to a power supply Vdc. A voltage between two ports of each voltage division capacitor may be Vdc/2.

As shown in FIG. 3, each branch may include four switches that are sequentially connected in series, and the four switches are denoted as a switch S1, a switch S2, a switch S3, and a switch S4. The switch S1 and the switch S3 have a complementary relationship, in other words, have opposite drive signals (or referred to as control signals). S2 and S4 have a complementary relationship.

Each branch further includes two clamp diodes, and the two clamp diodes are denoted as a diode D1 and a diode D2. A point of a connection line between a capacitor C1 and a capacitor C2 is denoted as a midpoint n1. An anode of the diode D1 and a cathode of the diode D2 are connected to the midpoint n1, a cathode of the diode D1 is connected to a connection line between the switch S1 and the switch S2, and an anode of the diode D2 is connected to a connection line between the switch S3 and the switch S4. A connection point between the switch S2 and the switch S3 in each branch may be used as an output port of the branch, and is connected to an input port of one phase of a motor. The diode D1 and the diode D2 each may also be referred to as a clamp diode. When both the switch S2 and the switch S3 in the branch are in an on state, an output port of the inverter may be clamped to the midpoint n1. In other words, a voltage of the output port of the inverter is a voltage of the midpoint n1.

The I-type inverter 400 may output three levels. One of the three branches is used as an example (which is referred to as a first branch for ease of description). In the first branch, when a switch S1 and a switch S2 are in an on state and a switch S3 and a switch S4 are in an off state, regardless of whether a current direction is a forward direction or a reverse direction, a voltage of an output port of the first branch is +Vdc/2. When the switch S2 and the switch S3 are in an on state and the switch S1 and the switch S4 are in an off state, regardless of whether the current direction is a forward direction or a reverse direction, the voltage of the output port of the first branch is 0. When the switch S3 and the switch S4 are in an on state and the switch S1 and the switch S2 are in an off state, regardless of whether the current direction is a forward direction or a reverse direction, the voltage of the output port of the first branch is −Vdc/2.

Figure 4:
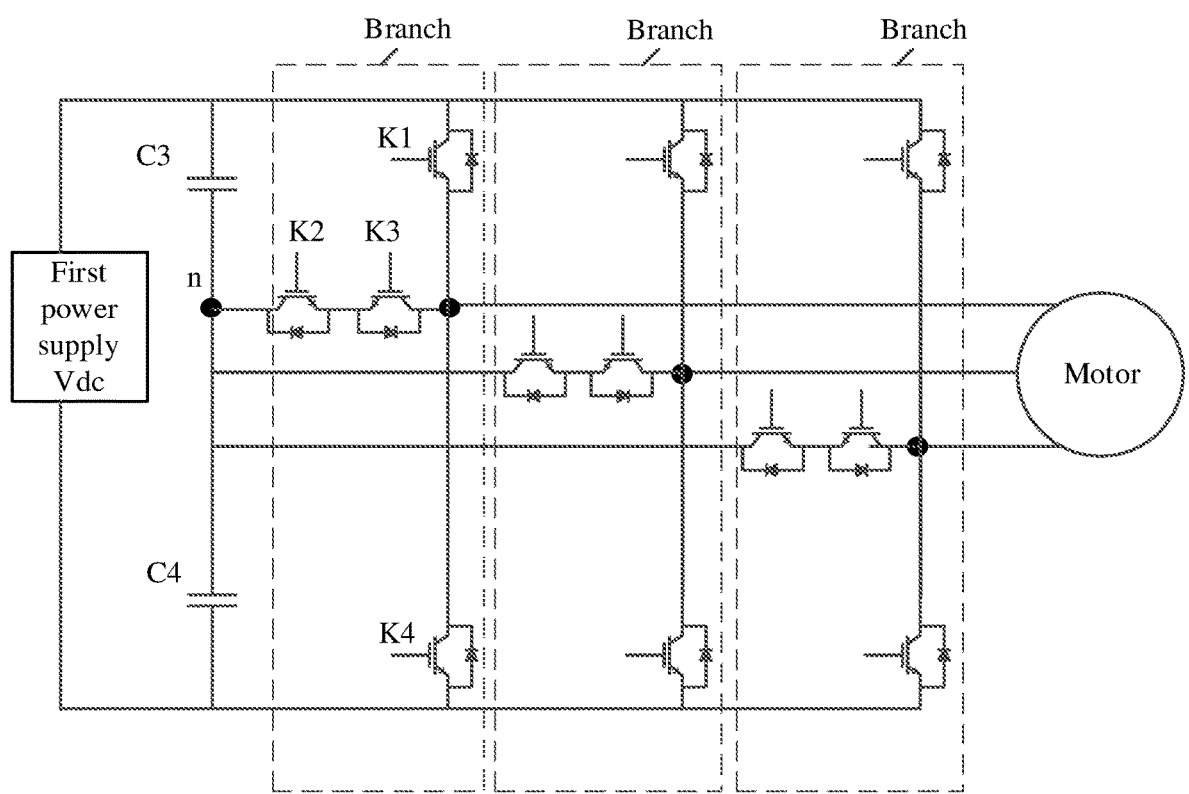
FIG. 4 is a schematic diagram of a structure of another three-level inverter.

The following describes a T-type three-level inverter. FIG. 4 is a schematic diagram of a structure of a T-type three-level inverter. The T-type three-level inverter is denoted as a T-type inverter 500 for ease of description. The T-type inverter 500 may include two voltage division capacitors (denoted as C3 and C4) and three branches. The two voltage division capacitors are connected in series, and capacitor parameters are the same. The T-type inverter 500 may be connected to a power supply Vdc. A voltage between two ports of each voltage division capacitor may be Vdc/2.

As shown in FIG. 4, each branch may include four switches, and the four switches are denoted as a switch K1, a switch K2, a switch K3, and a switch K4. A first connection port of the switch K1 is connected to one electrode of the power supply Vdc, and a second connection port is connected to a first connection port of the switch K4. A second connection port of the switch K4 is connected to another electrode of the power supply Vdc. A connection point between the switch K1 and the switch K4 in each branch may be used as an output port of the branch, and is connected to an input port of one phase of a motor.

A point of a connection line between the switch K1 and the switch K4 is denoted as a point p, and a point of a connection line between the capacitor C3 and the capacitor C4 is denoted as a midpoint n2. A first connection port of the switch K3 is connected to the point p, a second connection port of the switch K3 is connected to a first connection port of the switch K2, and a second connection port of the switch K2 is connected to the midpoint n2. The switch K2 and the switch K3 each may be a switch including a parasitic diode. As shown in FIG. 4, a cathode of a diode in the switch K2 is connected to the midpoint n2, and a cathode of a diode in the switch K3 is connected to the point p.

The T-type inverter 500 may output three levels. One of the three branches is used as an example (which is referred to as a second branch for ease of description). In the second branch, when a switch K1 and a switch K2 are in an on state and a switch K3 and a switch K4 are in an off state, regardless of whether a current direction is a forward direction or a reverse direction, a voltage of an output port of the second branch is Vdc/2. When the switch K2 and the switch K3 are in an on state and the switch K1 and the switch K4 are in an off state, regardless of whether the current direction is a forward direction or a reverse direction, the voltage of the output port of the second branch is 0. When the switch K3 and the switch K4 are in an on state and the switch K1 and the switch K2 are in an off state, regardless of whether the current direction is a forward direction or a reverse direction, the voltage of the output port of the second branch is −Vdc/2.

Compared with the three-phase full-bridge inverter, the I-type inverter 400 and the T-type inverter 500 each may output three levels, output a voltage with a low harmonic and a current with a low harmonic, and have high efficiency. However, in an actual application scenario, the I-type inverter 400 and the T-type inverter 500 have an inherent problem that a voltage of a midpoint (for example, the midpoint n1 and the midpoint n2) fluctuates. Usually, a reason for a fluctuation at a midpoint n in the three-level inverter is as follows: When the output voltage of the three-level inverter is 0, the switch S2 and the switch S3 in each branch in the I-type inverter 400 are in an on state, and the switch S1 and the switch S4 are in an off state, so that an output port of each branch is connected to the midpoint n1. Similarly, when the switch K2 and the switch K3 in each branch in the T-type inverter are in an on state and the switch K1 and the switch K4 are in an off state, the output port of each branch is connected to the midpoint n2.

When a current flows through the midpoint n in the three-level inverter, a charge distribution of the two voltage division capacitors changes. In other words, a midpoint voltage fluctuates. In addition, the midpoint voltage fluctuates especially prominently in cases of a low output frequency, a low power factor, and a large current working condition. If the midpoint voltage fluctuates too much, the output current is distorted, and the torque pulse is too large. In an extreme working condition, the inverter may be damaged.

In view of this, an embodiment of this application provides a motor driving apparatus. In a process of driving a motor, the motor driving apparatus may control the motor in a two-level working mode (which may be recorded as a first working mode) in a large torque area of the motor, to avoid a large fluctuation in a midpoint voltage. The motor driving apparatus controls the motor in a three-level working mode (which may be recorded as a second working mode) in a small torque area of the motor, to improve running efficiency of the motor. Such a design may improve comprehensive running efficiency of the motor, and may improve system efficiency of a system including the motor driving apparatus and the motor. The following provides descriptions with reference to the accompanying drawings.

An embodiment of this application provides a motor driving apparatus. The motor driving apparatus may be connected to a motor, and is configured to provide an output voltage for the connected motor, to drive the connected motor. The motor may be a permanent magnet synchronous motor, an induction motor, or the like. The motor driving apparatus may be applied to an electric vehicle or an industrial scenario. The motor driving apparatus provided in this embodiment of this application may include any one of the foregoing three-level inverters.

Figure 5A:
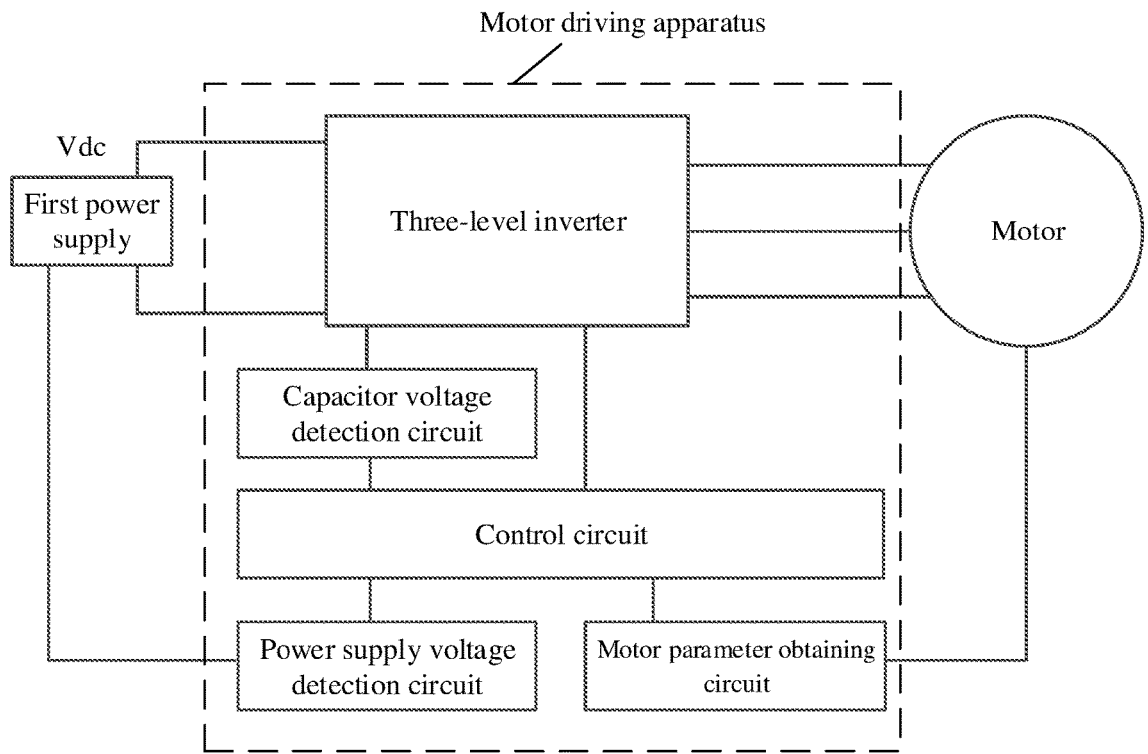
FIG. 5A is a schematic diagram of a structure of a motor driving apparatus.

Refer to FIG. 5A. The motor driving apparatus may include a three-level inverter and a control circuit. An input side of the three-level inverter is connected to a first power supply (a voltage may be denoted as Vdc), and an output side of the three-level inverter is connected to the motor. The control circuit may be connected to each switch in the three-level inverter, and control a state of each switch, for example, control the switch to be in an on state or an off state.

The switch in the three-level inverter may include but is not limited to an insulated gate bipolar transistor (IGBT), a metal-oxide semiconductor field-effect transistor (MOSFET), a silicon carbide (SiC)-based power switch device, or a gallium nitride (GaN)-based power switch device.

In this embodiment of this application, the control circuit may drive each switch in the three-level inverter in a plurality of working modes. The control circuit controls the three-level inverter in different control modes, so that the three-level inverter has different output voltages. The three-level inverter may be the I-type inverter 400 or T-type inverter 500.

The motor driving apparatus may include a capacitor voltage detection circuit. The capacitor voltage detection circuit may be connected to each voltage division capacitor in the three-level inverter, and is configured to detect a voltage of each voltage division capacitor. The capacitor voltage detection circuit is connected to the control circuit, and may provide the detected voltage of each voltage division capacitor for the control circuit.

The motor driving apparatus may include a motor parameter obtaining circuit. The motor parameter obtaining circuit is connected to the motor, and may collect or receive a motor working condition signal. The motor parameter obtaining circuit may be connected to the control circuit, and may provide the collected motor working condition signal or the obtained motor working condition signal for the control circuit.

The control circuit may select a target working mode from the plurality of working modes based on the motor working condition signal, and drive the three-level inverter in the selected target working mode. In other words, the control circuit may determine, based on the motor working condition signal, a working mode of driving the three-level inverter. In this embodiment of this application, the motor working condition signal may include but is not limited to a working current or a torque of the motor.

Figure 5B:
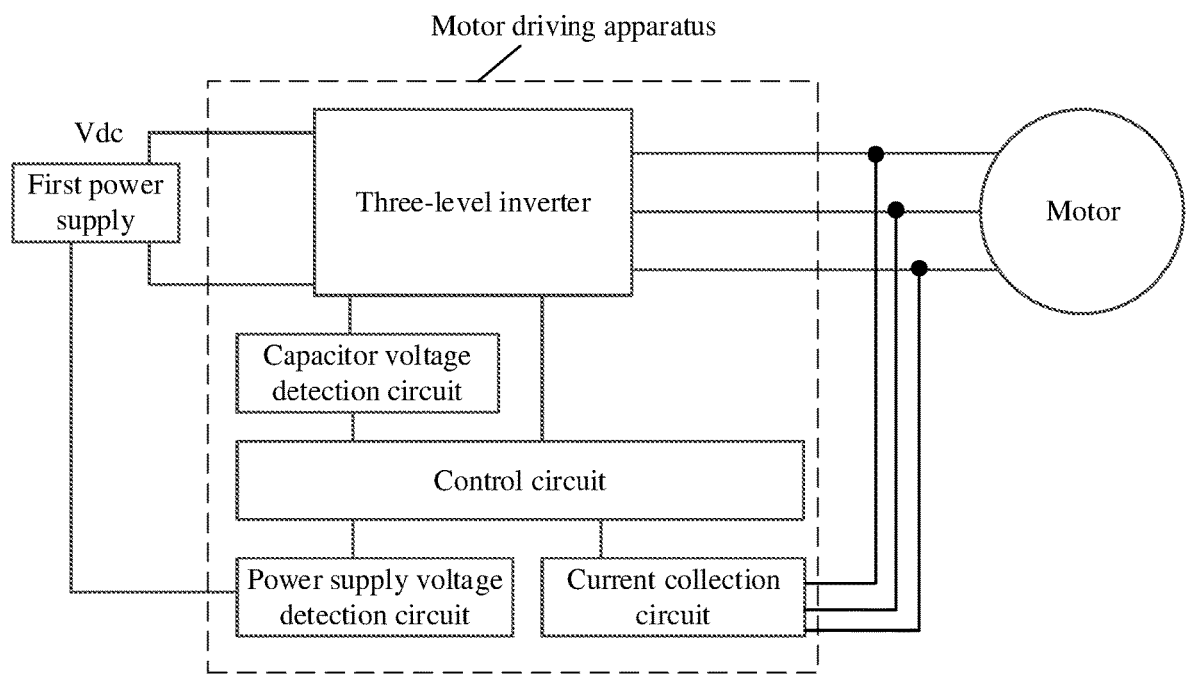
FIG. 5B is a schematic diagram of a structure of a motor driving apparatus.

In a possible design, the motor working condition signal may be a current at an input port of one or more phases of the motor. Refer to FIG. 5B. The motor parameter obtaining circuit may be implemented as a current collection circuit, and the current collection circuit may be coupled to the input port of one or more phases of the motor (in other words, coupled to an output port of one or more phases of the three-level inverter). The current collection circuit may be configured to: collect the current at the input port of one or more phases of the motor, and provide an effective value of the collected current for the control circuit. Optionally, the current collection circuit may include one or more current detection sensors. Each current detection sensor may be coupled to an input port of one phase of the motor, and is configured to collect the current at the coupled input port of one phase. Each current detection sensor may be further connected to the control circuit, and provide the detected current at the coupled input port of one phase for the control circuit.

In another possible design, the motor working condition signal may be a torque parameter of the motor. The motor parameter obtaining circuit may be implemented as an instruction receiving circuit, and the instruction receiving circuit may be a motor torque instruction. The motor torque instruction may carry the torque parameter of the motor. The control circuit may determine the motor working condition signal based on a received motor torque instruction. For example, the control circuit may receive a motor torque instruction sent by a torque instruction sending circuit. The torque instruction sending circuit may be a component outside the motor driving apparatus. The control circuit and the torque instruction sending circuit may be communicatively connected.

The following provides descriptions by using an example in which the motor working condition signal is the current at the input port of one or more phases of the motor. After the motor driving apparatus is started, the control circuit may drive each switch in the three-level inverter in a three-level working mode, so that the output voltage of the three-level inverter includes three levels.

The control circuit may determine, as a first current, the current (usually the effective value of the current) that is at the input port of one or more phases of the motor and that is provided by the current collection circuit. The first current may be a current at an input port of any phase in the current at the input port of one or more phases, or a largest value of currents at input ports of a plurality of phases, or an average value of currents at input ports of a plurality of phases.

If the first current is less than a first current threshold limit, the control circuit may select the three-level working mode. The control circuit may drive each switch in the three-level inverter in the three-level working mode, so that an output voltage of each branch in the three-level inverter includes three levels, for example, +Vdc/2, 0, and −Vdc/2. Herein, Vdc is a voltage value of the first power supply. When the first current is less than the first current threshold $I_{limit1}$, the motor works in a small torque area. The control circuit drives the three-level inverter in the three-level working mode, so that running efficiency of the motor is high.

When the first current is greater than or equal to the first current threshold $I_{limit1}$, the motor works in a large torque area. If the control circuit controls the three-level inverter in the three-level working mode, a midpoint voltage of the three-level inverter fluctuates too much. Consequently, the switch in the three-level inverter may be damaged. Therefore, when the first current is greater than or equal to the first current threshold $I_{limit1}$, the control circuit may select a two-level working mode. The control circuit may drive each switch in the three-level inverter in the two-level working mode, so that the output voltage of each branch in the three-level inverter includes two levels, for example, +Vdc/2 and −Vdc/2. In such a design, the output port of each branch may not be connected to a midpoint of the three-level inverter, so that the midpoint voltage of the three-level inverter may be less than a first voltage threshold $V_{limit1}$, to stabilize the midpoint voltage of the three-level inverter and avoid a fluctuation in the midpoint voltage of the three-level inverter.

Optionally, the first voltage threshold $V_{limit1}$ may be determined based on an actual application scenario or a test result. For example, if the midpoint voltage of the three-level inverter is greater than the first voltage threshold $V_{limit1}$, there is a high probability that the switch in the three-level inverter is damaged.

In a possible design, when the first current is greater than or equal to the first current threshold $I_{limit1}$, the control circuit selects the two-level working mode. If the control circuit is currently in the three-level working mode, the control circuit may determine, based on voltages of the two voltage division capacitors, whether a switching condition of switching from the three-level working mode to the two-level working mode is met.

In an example, the control circuit may determine, based on the voltage that is of each voltage division capacitor (for example, a voltage of a capacitor C1 is $V_{c1}$, and a voltage of a capacitor C2 is $V_{c2}$) in the three-level inverter and that is detected by the capacitor voltage detection circuit in real time, whether a difference $\Delta V$ ($|V_{c1}-V_{c2}|$) between the voltages of the two voltage division capacitors is less than a second voltage threshold $V_{limit2}$. After determining that the difference $\Delta V$ between the voltages of the two voltage division capacitors is less than the second voltage threshold $V_{limit2}$, the control circuit switches from the three-level working mode to the two-level working mode to drive the three-level inverter.

Figure 6:
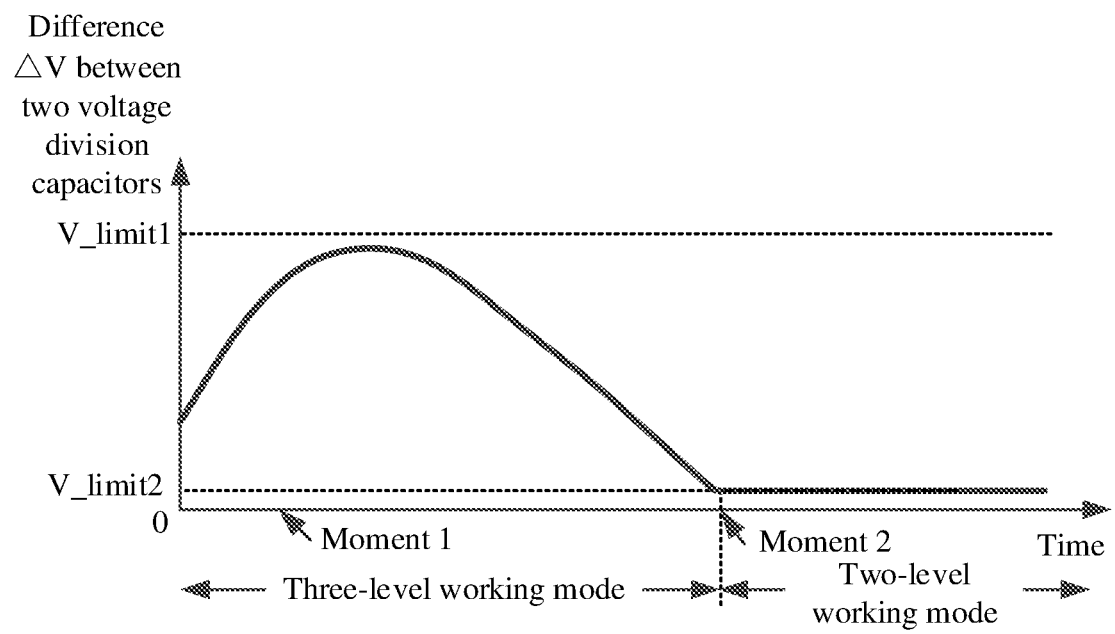
FIG. 6 is a schematic diagram of a relationship among a difference between two voltage division capacitors, a voltage threshold, and a switching moment.

For ease of description, FIG. 6 shows differences $\Delta V$ between voltages of two voltage division capacitors at different moments. It is assumed that the control circuit currently drives the three-level inverter in the three-level control mode. The control circuit may determine, in real time, whether the first current is less than the first current threshold $I_{limit1}$. If the first current is greater than or equal to the first current threshold $I_{limit1}$, the control circuit determines to select the two-level working mode (for example, selects the two-level working mode at a moment 1 in FIG. 6). Then, the control circuit determines whether the difference $\Delta V$ between the voltages of the two voltage division capacitors is less than the second voltage threshold $V_{limit2}$. When determining that the difference $\Delta V$ between the voltages of the two voltage division capacitors is less than the second voltage threshold $V_{limit2}$, the control circuit switches to the two-level working mode to drive the three-level inverter (for example, switches to the two-level working mode at a moment 2 in FIG. 6). The first voltage threshold $V_{limit1}$ is greater than the second voltage threshold $V_{limit2}$. Usually, the second voltage threshold $V_{limit2}$ is a small value close to 0.

The control circuit drives each switch in the three-level inverter in the two-level working mode, so that the output voltage of each branch in the three-level inverter includes two levels. The two levels may be +Vdc/2 and −Vdc/2. When each branch in the three-level inverter outputs two levels, the output port of each branch is not connected to a midpoint n, so that no current flows through the midpoint n, and a change in a charge distribution of the two voltage division capacitors is weak, to avoid a fluctuation in a voltage of the midpoint n.

The control circuit drives the three-level inverter in the three-level working mode before the moment 2, and switches to the two-level working mode at the moment 2 to drive the three-level inverter. In such a design, the midpoint voltage of the three-level inverter may be stable at a value close to 0, for example, the second voltage threshold $V_{limit2}$, so that the midpoint voltage of the three-level inverter is stabilized, to avoid damaging a switch due to the fluctuation in the midpoint voltage.

The current collection circuit may collect the current at the input port of one or more phases of the motor in real time, and provide the current for the control circuit. After driving each switch in the three-level inverter in the two-level working mode, the control circuit may determine a second current based on the received current at the input port of one or more phases of the motor. For ease of distinguishing, the first current is determined based on the received current at the input port of one or more phases of the motor in a process in which the control circuit drives the three-level inverter in the three-level working mode. In other words, the current that is at the input port of one or more phases of the motor and that is used when the control circuit determines the first current corresponds to a collection moment t1, the current that is at the input port of one or more phases of the motor and that is used when the control circuit determines the second current corresponds to a collection moment t2, and the collection moment t1 is earlier than the collection moment t2.

After the control circuit drives the three-level inverter in the two-level working mode, if the second current is less than a second current threshold $I_{limit2}$, the control circuit may switch to the three-level working mode to drive each switch in the three-level inverter. If the second current is greater than or equal to the second current threshold $I_{limit2}$, the control circuit may continue to drive the three-level inverter in the two-level working mode. Optionally, the second current threshold $I_{limit2}$ may be less than or equal to the first current threshold $I_{limit1}$.

In an example, the first current threshold $I_{limit1}$ and the second current threshold $I_{limit2}$ may be a same value. When a midpoint voltage of the I-type inverter 400 fluctuates, the control circuit may frequently switch between the three-level working mode and the two-level mode, and a switching loss is large.

In another example, the first current threshold $I_{limit1}$ is a value greater than the second current threshold $I_{limit2}$. For example, the control circuit may determine the second current threshold $I_{limit2}$ based on the first current threshold $I_{limit1}$ and preset hysteresis dv (usually a positive number). For example, the first current threshold $I_{limit1}$ may be a sum of the second current threshold $I_{limit2}$ and the preset hysteresis dv.

In a possible design, if the control circuit drives the three-level inverter in the three-level working mode currently (at a current time), the first current threshold $I_{limit1}$ is used as a reference signal threshold. The control circuit may determine, as a third current, the current that is at the input port of one or more phases of the motor and that is provided by the current collection circuit. Then, the control circuit may compare the third current and the reference signal threshold, and select a working mode based on a comparison result.

If the control circuit drives the three-level inverter in the two-level working mode currently (at the current time), the second current threshold $I_{limit2}$ is used as a reference signal threshold. Then, the control circuit may compare the third current and the reference signal threshold, and select a working mode based on a comparison result.

In a possible implementation, the motor driving apparatus may include a power supply voltage detection circuit. The power supply voltage detection circuit is configured to detect a voltage of the first power supply. The power supply voltage detection circuit may be connected to the control circuit, and may provide the detected voltage of the first power supply for the control circuit. The control circuit may determine expected output voltage information of each branch in the three-level working mode based on the detected voltage Vdc of the first power supply. The control circuit may determine expected output voltage information of each branch in the two-level working mode based on the detected voltage of the first power supply. The expected voltage information of each branch is used to drive the three-level inverter.

The following separately describes the process in which the control circuit drives the three-level inverter in the three-level working mode (a second working mode) and a process in which the control circuit drives the three-level inverter in the two-level working mode (a first working mode).

First, a process in which the control circuit drives each switch in the three-level inverter in the three-level working mode is described. That the control circuit drives each switch in the three-level inverter in the three-level working mode is a conventional SVPWM mode of the three-level inverter. The three-level inverter may be the I-type inverter 400, or may be the T-type inverter 500. The I-type inverter 400 is used as an example below.

Three branches in the I-type inverter 400 are denoted as a branch La, a branch Lb, and a branch Lc, the three branches correspond to three phases of the motor, and output ports of the three branches each are connected to an input port of a corresponding phase of the motor. One branch is used as an example. If expected output voltage information of the branch is first information, the expected output voltage information may be denoted as "2", a voltage corresponding to the first information is +Vdc/2, and an output state of the branch may be denoted as P. If expected output voltage information of the branch is second information, the expected output voltage information may be denoted as "1", a voltage corresponding to the second information is 0, and an output state of the branch is denoted as O. If expected output voltage information of the branch is third information, the expected output voltage information may be denoted as "0", a voltage corresponding to the third information is −Vdc/2, and an output state of the branch is denoted as N. It can be learned that, output states of each branch in the I-type inverter 400 may be represented in the following manner:

$$L_x = \begin{cases} 2, \text{ output state is } P \\ 1, \text{ output state is } O, \text{ where } x = a, b, c \\ 0, \text{ output state is } N \end{cases}$$

Figure 7:
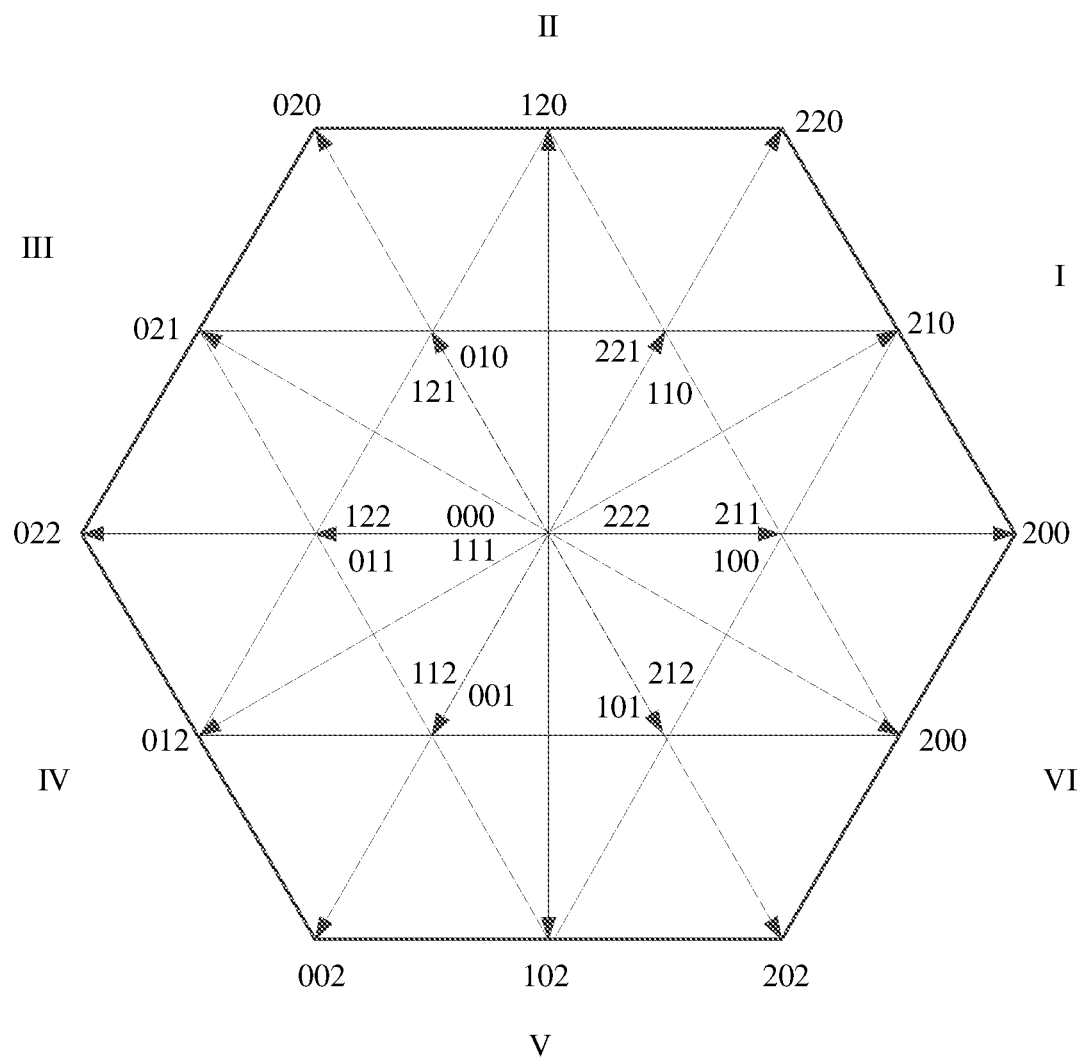
FIG. 7 is a schematic diagram of a state vector distribution of a three-level inverter.

One branch may have three output states, and the I-type inverter 400 may have $3^3=27$ output states. Each output state of the I-type inverter 400 may be represented by using a basic voltage vector. A basic voltage vector may include expected output voltage information of an output state of each branch. FIG. 7 is a diagram of a vector distribution corresponding to 27 output states of an I-type inverter 400. For example, a branch La corresponding to a basic voltage vector 220 is in an output state P, a branch Lb is in an output state P, and a branch Lc is in an output state N.

The 27 basic voltage vectors of the I-type inverter 400 form a space vector diagram. A basic voltage vector 000, a basic voltage vector 111, and a basic voltage vector 222 are vectors (zero vectors) at a same location in the space vector diagram. A basic voltage vector 221 and a basic voltage vector 110 are vectors at a same location (that is, a same basic active vector) in the space vector diagram. A basic voltage vector 211 and a basic voltage vector 100 are vectors at a same location (that is, a same basic active vector) in the space vector diagram. A basic voltage vector 212 and a basic voltage vector 101 are vectors at a same location (that is, a same basic active vector) in the space vector diagram. A basic voltage vector 112 and a basic voltage vector 001 are vectors at a same location (that is, a same basic active vector) in the space vector diagram. A basic voltage vector 122 and a basic voltage vector 011 are vectors at a same location (that is, a same basic active vector) in the space vector diagram. A basic voltage vector 121 and a basic voltage vector 010 are vectors at a same location (that is, a same basic active vector) in the space vector diagram. It can be learned that the 27 basic voltage vectors of the I-type inverter 400 correspond to 18 basic active vectors and three zero vectors.

The space vector diagram may be divided into six large sectors, and the six large sectors may be denoted as a sector I, a sector II, a sector III, a sector IV, a sector V, and a sector VI. An angle of each sector is 60°. As shown in FIG. 7, in a two-phase orthogonal coordinate system (an αβ coordinate system), sectors do not overlap each other, and each sector has a corresponding coordinate range of an α axis and a coordinate range of a β axis.

Figure 8:
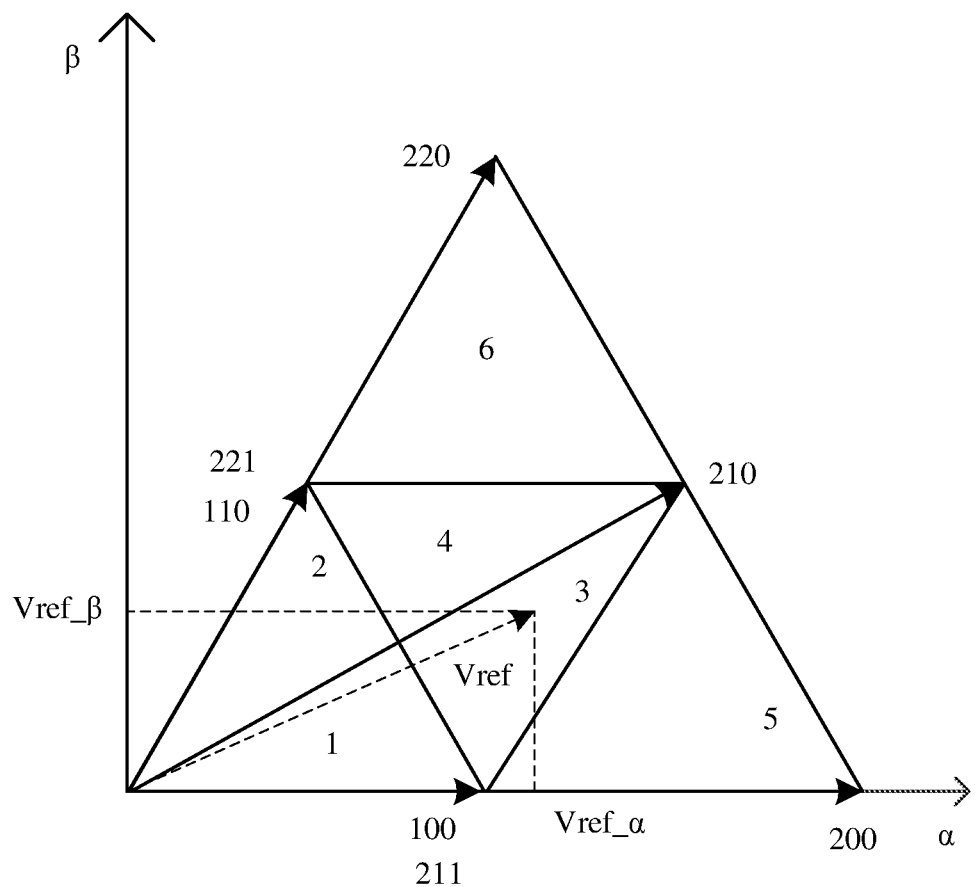
FIG. 8 is a schematic diagram of a process of synthesizing a reference voltage vector based on three-level SVPWM.

Each large sector may include a plurality of triangular regions. As shown in FIG. 8, the sector I is used as an example. The sector I may include six triangular regions. For example, the six triangular regions are denoted as a region 1, a region 2, a region 3, and the like. Each region has a corresponding basic voltage vector. For example, a vector for which a vertex of a region is used as a vector vertex is a corresponding basic voltage vector of the region. For example, basic active vectors corresponding to the region 3 are the basic voltage vector 210, the basic voltage vector 211 (or the basic voltage vector 100), and the basic voltage vector 221 (or the basic voltage vector 110). The control circuit may select a plurality of basic active vectors from basic voltage vectors corresponding to a region to which a reference voltage vector $V_{ref}$ belongs, to synthesize the reference voltage vector $V_{ref}$. For example, the control circuit may select four or five basic voltage vectors from the 27 basic voltage vectors, to synthesize the reference voltage vector $V_{ref}$.

Usually, the motor driving apparatus controls the motor in a closed-loop control manner. The control circuit may obtain an expected output current value of the motor and an actual output current of the motor. The control circuit may determine the reference voltage vector $V_{ref}$ based on the expected output current value of the motor and the actual output current of the motor.

The control circuit may determine, based on a component of the reference voltage vector $V_{ref}$ on the α axis and a component on the β axis, the region to which the reference voltage vector $V_{ref}$ belongs. As shown in FIG. 8, it is assumed that the control circuit determines, based on the component $V_\alpha$ of the reference voltage vector $V_{ref}$ on the α axis and the component $V_\beta$ on the β axis, that the reference voltage vector is in the region 3 in the sector I. The control circuit may determine at least one vector (a basic active vector and/or a zero vector) from basic voltage vectors corresponding to the region 3, to synthesize the reference voltage vector $V_{ref}$.

There may be two processes in which the control circuit synthesizes the reference voltage vector $V_{ref}$: determining action duration of the vector, and determining a basic voltage vector and a corresponding action time period.

It is assumed that the control circuit selects three adjacent vectors (basic active vectors and/or zero vectors) around the reference voltage vector $V_{ref}$ from the basic voltage vectors corresponding to the region to which the reference voltage vector $V_{ref}$ belongs, and the three vectors are denoted as V1, V2, and V3. The control circuit may calculate, based on a volt-second balance principle, action time of the three adjacent vectors around the reference voltage vector $V_{ref}$. Refer to the following formula:

$$V_{ref} \times TS = V1 \times t1 + V2 \times t2 + V3 \times t3$$

$$V_\alpha \times TS = V1_\alpha \times t1 + V2_\alpha \times t2 + V3_\alpha \times t3$$

$$V_\beta \times TS = V1_\beta \times t1 + V2_\beta \times t2 + V3_\beta \times t3$$

$$TS = t1 + t2 + t3$$

TS is duration of a control period, $V_{ref}$ is the reference voltage vector, t1 is action duration of V1 (action duration in a control period), t2 is action duration of V2, t3 is action duration of V3, $V1_\alpha$ is a component of V1 on the α axis, $V2_\alpha$ is a component of V2 on the α axis, $V2_\alpha$ is a component of V2 on the α axis, $V1_\beta$ is a component of V1 on the β axis, $V2_\beta$ is a component of V2 on the β axis, and $V3_\beta$ is a component of V3 on the β axis. For ease of distinguishing, the determined vector may be recorded as a selected vector. The control circuit may determine action duration corresponding to each selected vector.

After determining each selected vector and action duration corresponding to each selected vector, the control circuit may determine, in a seven-segment symmetric PWM mode based on a principle that a drive signal of a switch in only one branch in two adjacent segments has a different level (in other words, a principle of switching a switch in only one branch each time), a basic voltage vector corresponding to the selected vector and action duration corresponding to each basic voltage vector.

Figure 9:
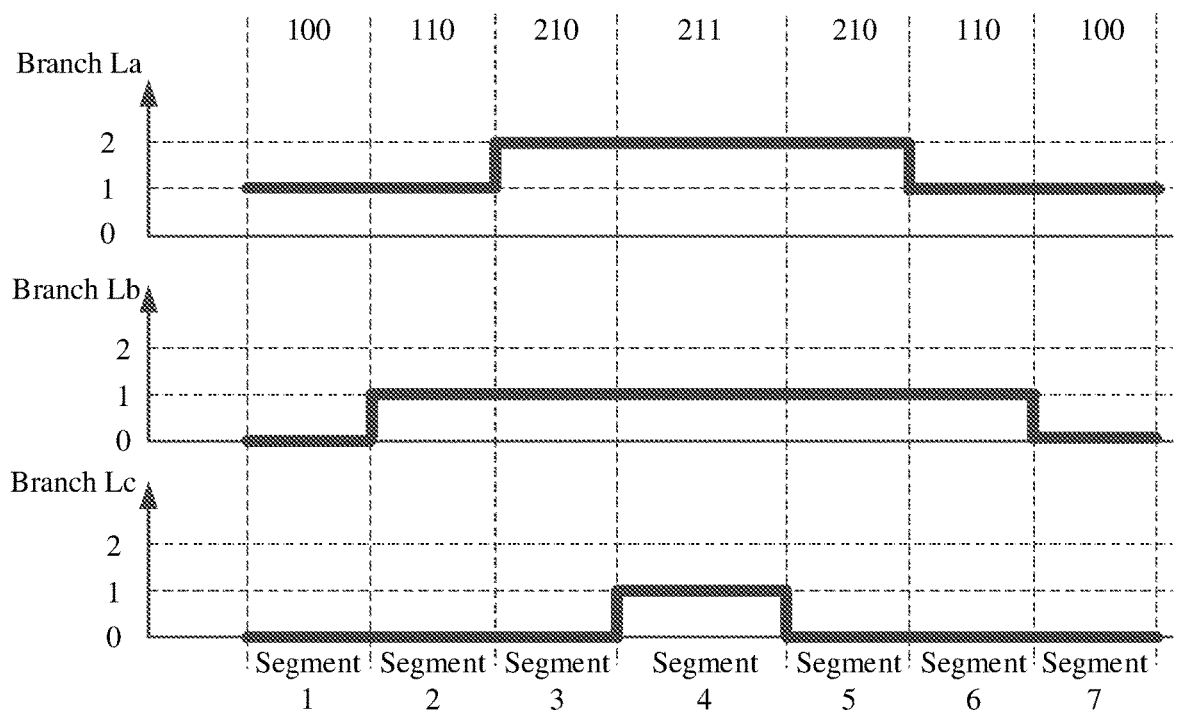
FIG. 9 is a schematic diagram of output states of branches in a three-level inverter.

In the seven-segment symmetric PWM mode, a PWM waveform corresponding to an output state (expected output voltage information) of each branch in each control period is symmetric with respect to a middle moment of the control period, as shown in FIG. 9. One control period may be segmented into seven segments. A vector corresponding to a segment 1 and a vector corresponding to a segment 7 are a same basic voltage vector, and the segment 1 and the segment 7 correspond to same action duration. Similarly, a vector corresponding to a segment 2 and a vector corresponding to a segment 6 are a same basic vector, and the segment 2 and the segment 6 correspond to same action duration. A vector corresponding to a segment 3 and a vector corresponding to a segment 5 are a same basic voltage vector, and the segment 3 and the segment 5 correspond to same action duration.

In a process in which the control circuit determines the basic voltage vector corresponding to each selected vector and the action duration corresponding to each basic voltage vector, the basic voltage vector corresponding to each segment may be determined based on the principle that a drive signal of a switch in only one branch in two adjacent segments has a different level. If one selected vector corresponds to only one basic voltage vector, action duration corresponding to the selected vector is action duration corresponding to a basic voltage vector corresponding to the selected vector. If one selected vector corresponds to a plurality of basic voltage vectors, the control circuit may select at least one basic voltage vector from a plurality of basic voltage vectors corresponding to the selected vector, and determine action duration corresponding to the selected basic voltage vector. For example, if the selected vector is a zero vector, the corresponding basic voltage vector includes a basic voltage vector 000, a basic voltage vector 111, and a basic voltage vector 222. For another example, two basic voltage vectors corresponding to the selected vector are a basic voltage vector 211 and a basic voltage vector 110.

For ease of understanding the foregoing process, descriptions are provided with reference to an example. It is assumed that the region to which the reference voltage vector $V_{ref}$ belongs is the region 3 in the sector I. As shown in FIG. 9, after determining at least one vector (at least one selected vector) and action duration corresponding to each selected vector from the basic voltage vectors corresponding to the region 3, the control circuit may determine, in the seven-segment symmetric PWM mode based on the principle of switching a switch in only one branch each time, a selected vector and action duration corresponding to each segment. In vectors of the synthesized reference voltage vector $V_{ref}$ corresponding to the region 3, the vector V1 corresponds to a plurality of basic voltage vectors that are the basic voltage vector 100 and the basic voltage vector 211, the vector V2 corresponds to the basic voltage vector 110, and the vector V3 corresponds to the basic voltage vector 210. The control circuit selects the basic voltage vector 100 and the basic voltage vector 211 from the plurality of basic voltage vectors corresponding to the vector V1, to satisfy the principle of switching a switch in one branch each time. The control circuit may determine that in one control period, a vector corresponding to the segment 1 is the basic voltage vector 100, a vector corresponding to the segment 2 is the basic voltage vector 110, a vector corresponding to the segment 3 is the basic voltage vector 210, a vector corresponding to a segment 4 is the basic voltage vector 211, a vector corresponding to the segment 5 is the basic voltage vector 210, a vector corresponding to the segment 6 is the basic voltage vector 110, and a vector corresponding to the segment 7 is the basic voltage vector 100. In one control period, a sum of action time of the basic voltage vector 100 and action time of the basic voltage vector 211 is t1, a sum of action time of the basic voltage vector 110 is t2, and the sum of action time of the basic voltage vector 210 is t3.

For example, the action duration of the basic voltage vector 100 is T1 in the segment 1 and the segment 7, and the action duration of the basic voltage vector 211 is T2 in the segment 4. Therefore, t1=T1+T2+T1. Optionally, T2 is 0.5t1, and T1 is 0.25t1. Similarly, in the segment 2 and the segment 6, the action duration of the basic voltage vector 110 is T3, and t2=T3+T3. In the segment 3 and the segment 6, the action duration of the basic voltage vector 210 is T4, and t3=T4+T4.

Figure 10:
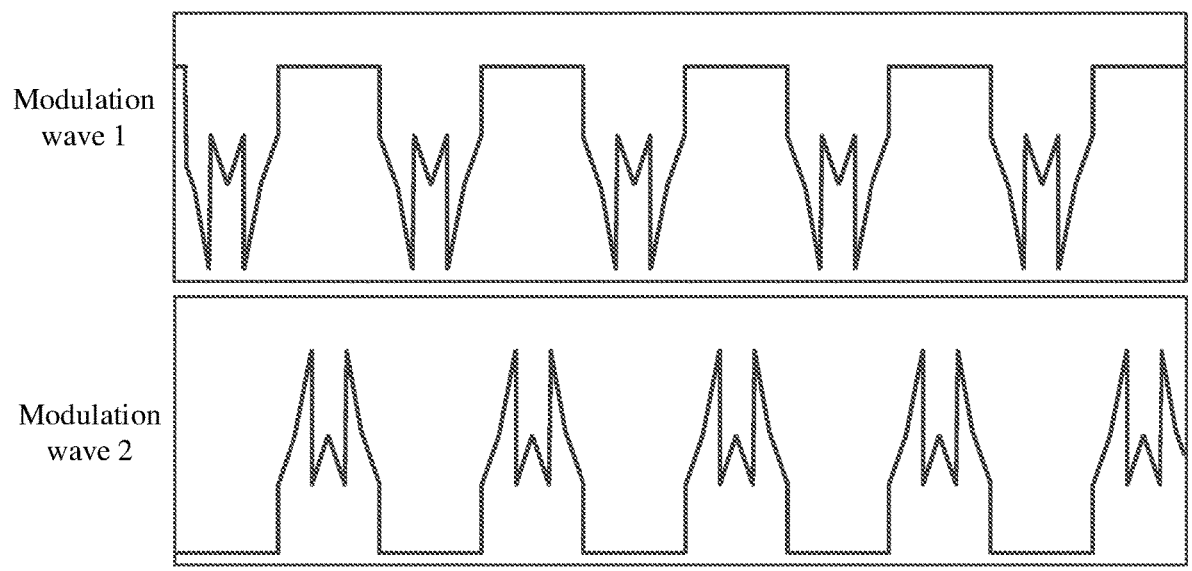
FIG. 10 is a schematic diagram of modulation waves of switches in a branch in a three-level inverter.

The control circuit may determine, based on expected output voltage information that is of each branch and that is included in a basic voltage vector corresponding to each segment, a drive signal of each switch in each branch in an action time period corresponding to the segment. For example, after determining the basic voltage vector and the corresponding action time period, the control circuit may determine expected output voltage information corresponding to each branch in the action time period corresponding to each determined basic voltage vector, and may determine a modulation wave corresponding to each branch. As shown in FIG. 10, for a modulation wave of one branch in the I-type inverter 400, a modulation wave 1 is a modulation wave corresponding to a switch S1 and a switch S3, and a modulation wave 2 is a modulation wave corresponding to a switch S2 and a switch S4. A carrier may be a triangular wave. If an amplitude of a carrier signal at a moment tk is greater than an amplitude of the modulation wave 1 at the moment tk, a generated drive signal of the switch S1 may drive the switch S1 to be in an on state, and a generated drive signal of the switch S3 may drive the switch S3 to be in an off state. If the amplitude of the carrier signal at the moment tk is less than the amplitude of the modulation wave 1 at the moment tk, the generated drive signal of the switch S1 may drive the switch S1 to be in an off state, and the generated drive signal of the switch S3 may drive the switch S3 to be in an off state. It can be learned that drive signals of the switch S1 and the switch S3 are opposite. In other words, running states of the switch S1 and the switch S3 are opposite. Similarly, drive signals of the switch S1 and the switch S3 are opposite, and running states of the switch S2 and the switch S4 are also opposite.

Figure 11:
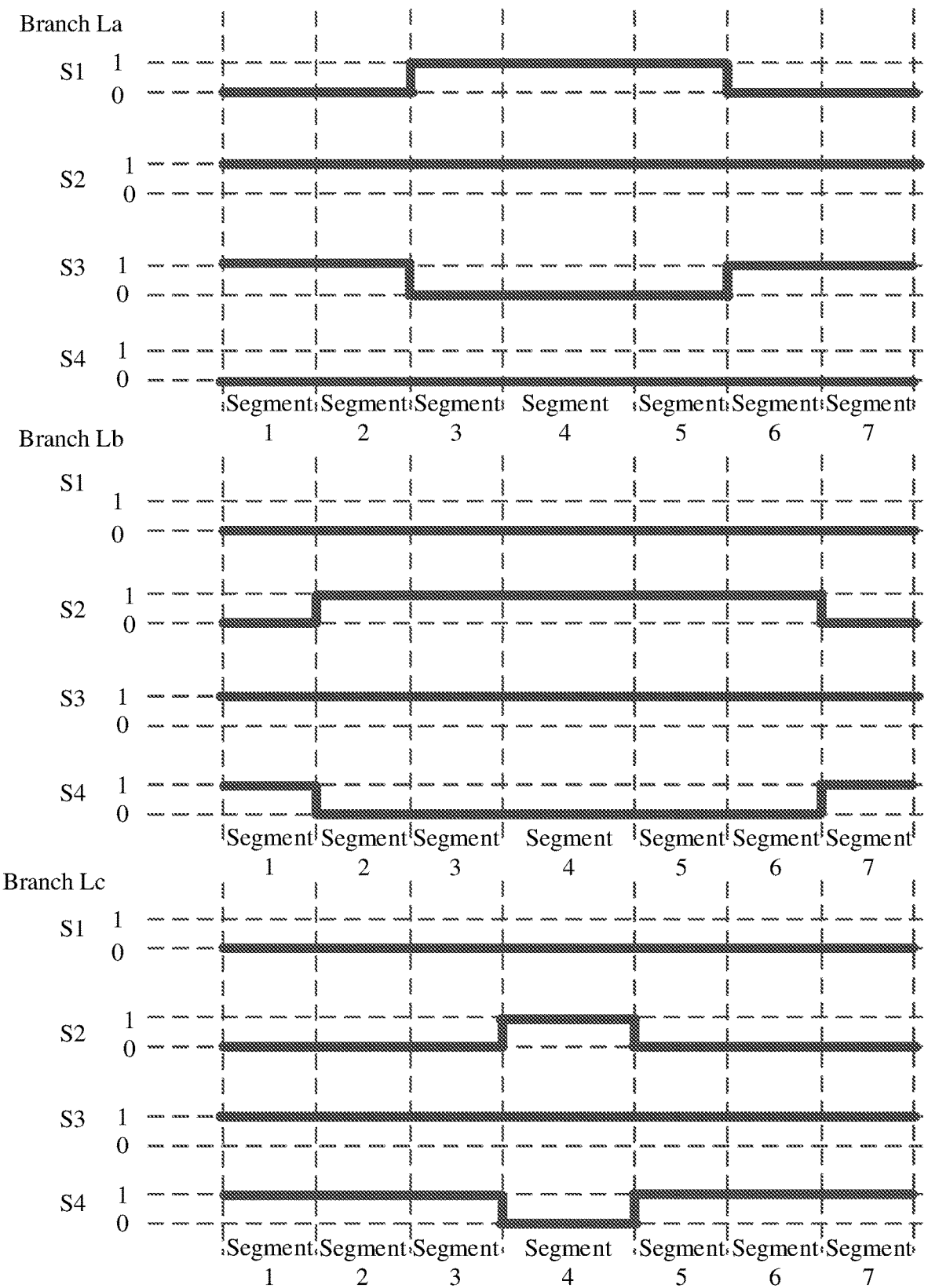
FIG. 11 is a schematic diagram of drive signals of switches in branches in a three-level inverter.

The control circuit may modulate the carrier based on a modulation wave corresponding to each branch, to generate a drive signal of a switch in each branch. The segment 1 is used as an example for description. As shown in FIG. 11, the vector corresponding to the segment 1 is the basic voltage vector 100. In other words, an output state of the branch La is 0, expected output voltage information corresponding to the branch La is "1", and a corresponding voltage is 0. The control circuit may control the switch S2 and the switch S3 in the branch La to be in an on state, and control the switch S1 and the switch S4 to be in an off state. High-level signals corresponding to duration T1 of the drive signals that are of the switch S2 and the switch S3 and that are generated by the control circuit may drive the switch S2 and the switch S3 to be in an off state in the action duration T1 corresponding to the segment 1 in one control period. Low-level signals corresponding to duration T1 of the drive signals that are of the switch S1 and the switch S4 and that are generated by the control circuit may enable the switch S1 and the switch S4 to be in an off state in the action duration T1 of the segment 1 in one control period.

The control circuit generates the drive signal of each switch in each branch in the seven-segment symmetric PWM mode, to reduce harmonics as much as possible, reduce a quantity of times of switching between switch states, and reduce a switching loss.

A process in which the control circuit drives each switch in the three-level inverter in the two-level working mode is described below. The two-level working mode provided in this application may include but is not limited to any one of the following modes.

Model 1

The control circuit may synthesize the reference voltage vector $V_{ref}$ based on vectors (basic voltage vectors) corresponding to the 27 output states of the I-type inverter 400. The control circuit may synthesize the reference voltage vector $V_{ref}$ based on only a plurality of basic voltage vectors in the 27 basic voltage vectors. The plurality of basic voltage vectors may include all large vectors and two zero vectors. For example, all the large vectors in the 27 vectors are the basic voltage vector 200, the basic voltage vector 220, the basic voltage vector 020, the basic voltage vector 022, the basic voltage vector 002, and the basic voltage vector 202. The two zero vectors may be the basic voltage vector 222 and the basic voltage vector 000.

Figure 12:
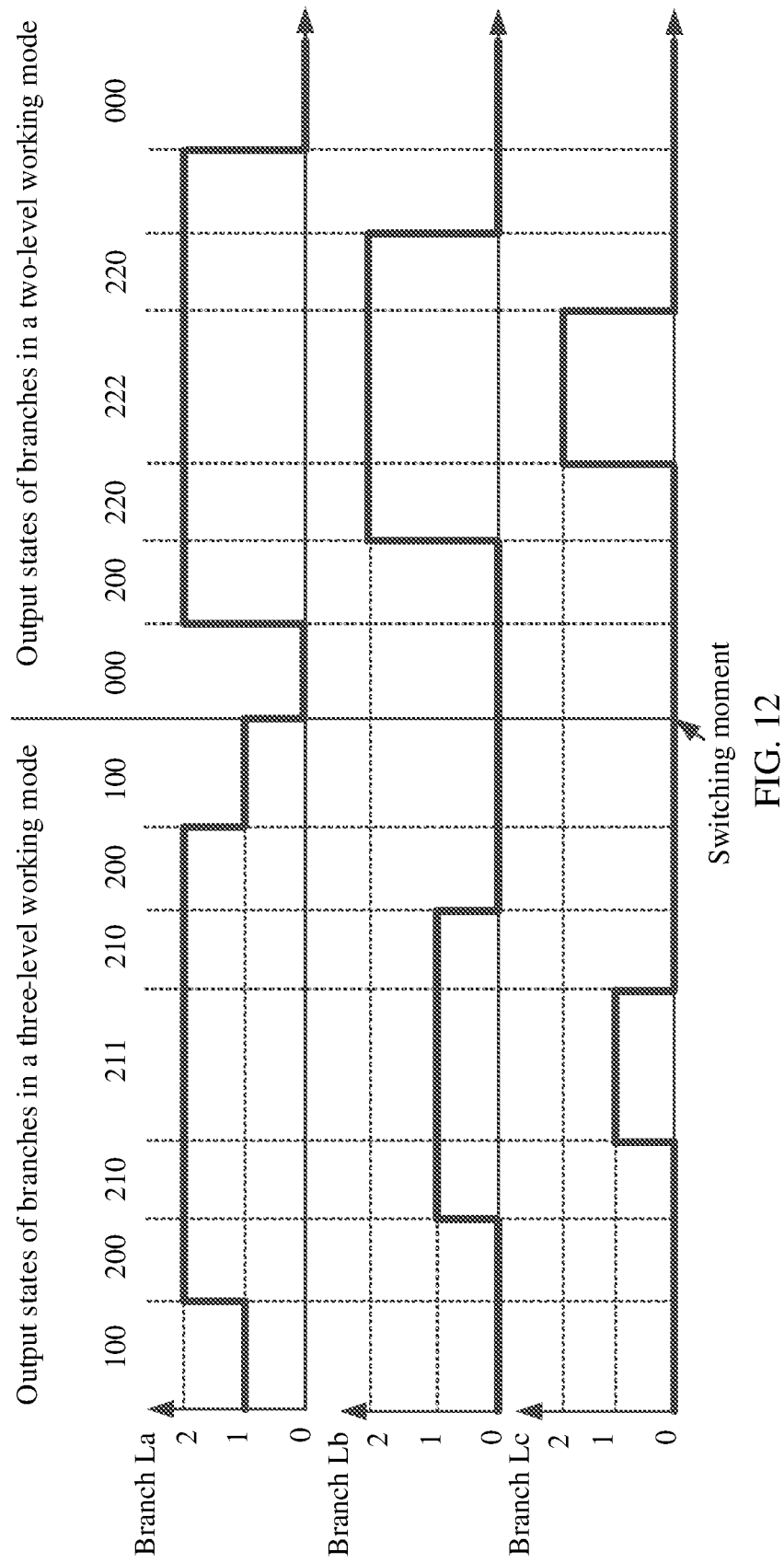
FIG. 12 is a schematic diagram of output states of branches switching from a three-level working mode to a two-level working mode.

Correspondingly, vectors that are not used when the control circuit synthesizes the reference voltage vector $V_{ref}$ may include all middle vectors (for example, the basic voltage vector 120, the basic voltage vector 021, the basic voltage vector 012, the basic voltage vector 102, the basic voltage vector 200, and the basic voltage vector 210), all small vectors (for example, the basic voltage vector 121, the basic voltage vector 010, the basic voltage vector 221, the basic voltage vector 110, the basic voltage vector 211, the basic voltage vector 100, the basic voltage vector 212, the basic voltage vector 101, the basic voltage vector 112, the basic voltage vector 001, the basic voltage vector 122, and the basic voltage vector 011), and a zero vector (for example, the basic voltage vector 111). FIG. 12 is a schematic diagram of an output state of each branch in a three-level working mode and an output state of each branch in a mode 1. It can be learned that in the three-level working mode, the control circuit synthesizes the reference voltage vector $V_{ref}$ based on only a large vector and a zero vector (the basic voltage vector 222 and the basic voltage vector 000). It should be understood that in the mode 1, a basic voltage vector corresponding to each segment does not include the second information ("1"), in other words, does not include expected output voltage information corresponding to a voltage 0. In other words, in the mode 1, an output voltage of each branch is not 0, and an output voltage of each branch may be +Vdc/2 or −Vdc/2. In this case, an output port of each branch is not connected to a midpoint between the two voltage division capacitors.

As shown in FIG. 7, a space vector diagram including vectors of the 27 output states of the I-type inverter 400 may be classified into six sectors. Each sector may include two large vectors. For example, the sector I includes two large vectors, and the two large vectors are the basic voltage vector 200 and the basic voltage vector 220. After determining a sector x to which the reference voltage vector $V_{ref}$ belongs (the foregoing method for determining a sector to which the reference voltage vector belongs in conventional SVPWM may be used, and details are not described herein again), the control circuit may synthesize the reference voltage vector $V_{ref}$ based on two large vectors and a zero vector corresponding to the sector x. The control circuit selects at least one vector (selected vector) from the two large vectors and the zero vector corresponding to the sector x.

It is assumed that the selected vector is the zero vector and the two large vectors corresponding to the sector x, and the reference voltage vector $V_{ref}$ is synthesized with reference to the following formula:

$$V_{ref} \times TS = M1 \times p1 + M2 \times p2 + M3 \times p3$$

$$V_\alpha \times TS = M1_\alpha \times p1 + M2_\alpha \times p2$$

$$V_\beta \times TS = M1_\beta \times p1 + M2_\beta \times p2$$

$$TS = p1 + p2 + p3$$

TS is the duration of the control period, $V_{ref}$ is the reference voltage vector, M1 and M2 each are a large vector corresponding to the sector x to which the reference voltage vector $V_{ref}$ belongs, M3 is the zero vector, p1 is an action time of M1 (an action time period in one control period), p2 is action time of M2, p3 is action time of M3, $M1_\alpha$ is a component of M1 on the α axis, $M2_\alpha$ is a component of M2 on the α axis, $M2_\alpha$ is a component of M2 on the α axis, $M1_\beta$ is a component of M1 on the β axis, and $M2_\beta$ is a component of V2 on the β axis. It can be learned that, in the foregoing process, the control circuit may determine each selected vector and an action time period corresponding to each selected vector. In a process in which the control circuit determines, in the seven-segment symmetric PWM mode based on the principle that a drive signal of a switch in only one branch in two adjacent segments has a different level (in other words, a principle of switching a switch in only one branch each time), a basic voltage vector and an action time period corresponding to each segment, the basic voltage vector corresponding to each segment is a basic voltage vector in the large vector and the zero vector (the basic voltage vector 222 and the basic voltage vector 000).

The control circuit may determine a basic voltage vector corresponding to each segment and an action time period corresponding to each segment. The control circuit may determine, based on expected output voltage information that is of each branch and that is included in a basic voltage vector corresponding to each segment, a drive signal of each switch in each branch in an action time period corresponding to the segment, and apply the drive signal to each switch, so that each branch outputs a voltage corresponding to the corresponding expected output voltage information.

Mode 2

Different from the three-level working mode, for any branch (recorded as a third branch) in the I-type inverter 400, expected output voltage information of the third branch is fourth information, and may be denoted as "T", and a voltage corresponding to the fourth information is +Vdc/2. The expected output voltage information of the third branch is fifth information, and may be denoted as "X", and a voltage corresponding to the fifth information is −Vdc/2.

The control circuit may control a switch S1 and a switch S2 in the third branch to be in an on state, and control a switch S3 and a switch S4 to be in an off state, so that an output voltage of an output port of the third branch is +Vdc/2. The control circuit may control the switch S3 and the switch S4 in the third branch to be in an on state, and control the switch S1 and the switch S2 to be in an off state, so that the output voltage of the output port of the third branch is −Vdc/2.

One branch may have two output states, and output states of the I-type inverter 400 are a total of eight output states. Each output state of the I-type inverter 400 may be represented by using a basic voltage vector. A basic voltage vector may include expected output voltage information of an output state of each branch. The control circuit may select a plurality of vectors from basic voltage vectors corresponding to the eight output states, to synthesize the reference voltage vector $V_{ref}$.

Figure 13:
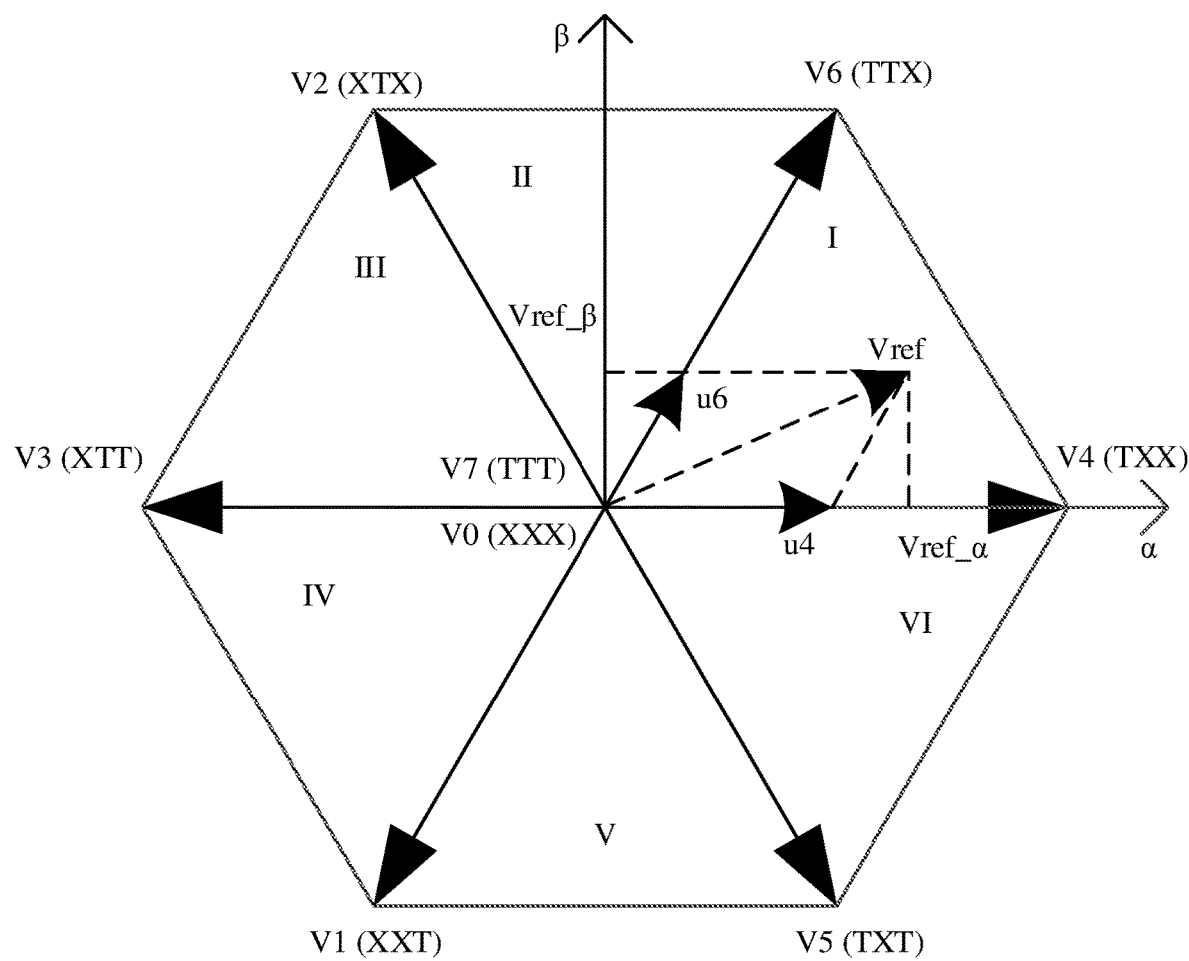
FIG. 13 is a schematic diagram of a state vector distribution of another three-level inverter.

FIG. 13 is a diagram of a distribution of basic voltage vectors of eight output states. The basic voltage vectors are a basic voltage vector TTX, a basic voltage vector TXX, a basic voltage vector TXT, a basic voltage vector XXT, a basic voltage vector XTT, a basic voltage vector XTX, a basic voltage vector XXX, and a basic voltage vector TTT. The basic voltage vector XXX and the basic voltage vector TTT are zero vectors, amplitudes are 0, and amplitudes of the other vectors are ⅔Vdc. The basic voltage vector TTX is used as an example. When the output state of the I-type inverter 400 is TTX, the output voltage of the branch La is +Vdc/2, the output voltage of the branch Lb is +Vdc/2, and the output voltage of the branch Lc is −Vdc/2.

Similarly, as shown in FIG. 12, a vector distribution diagram of the eight output states of the I-type inverter 400 may be divided into six large sectors, and an angle of each sector is 60°. For example, as shown in FIG. 13, in a two-phase orthogonal coordinate system (an αβ coordinate system), sectors do not overlap each other, and each sector has a corresponding coordinate range of an a axis and a coordinate range of a β axis.

The control circuit may synthesize the reference voltage vector based on basic voltage vectors corresponding to the eight output states of the I-type inverter 400. The control circuit may first determine the sector to which the reference voltage vector $V_{ref}$ belongs. For example, the control circuit may use the foregoing method for determining a sector to which the reference voltage vector belongs in conventional SVPWM. For example, the sector to which the reference voltage vector $V_{ref}$ belongs is determined based on a component $V_\alpha$ of the reference voltage vector $V_{ref}$ on an α axis and a component $V_\beta$ on a β axis in a preset coordinate system.

The control circuit may calculate, based on the volt-second balance principle, action duration of two basic active vectors and a zero vector corresponding to the sector to which the reference voltage vector $V_{ref}$ belongs. The duration TS of the control period, the reference voltage vector $V_{ref}$, the basic active vector corresponding to the sector to which the reference voltage vector $V_{ref}$ belongs, the zero vector, and the action duration corresponding to each vector satisfy the following relational expression:

$$V_{ref} \times TS = W1 \times k1 + W2 \times k2 + W3 \times k3$$

Figure 14:
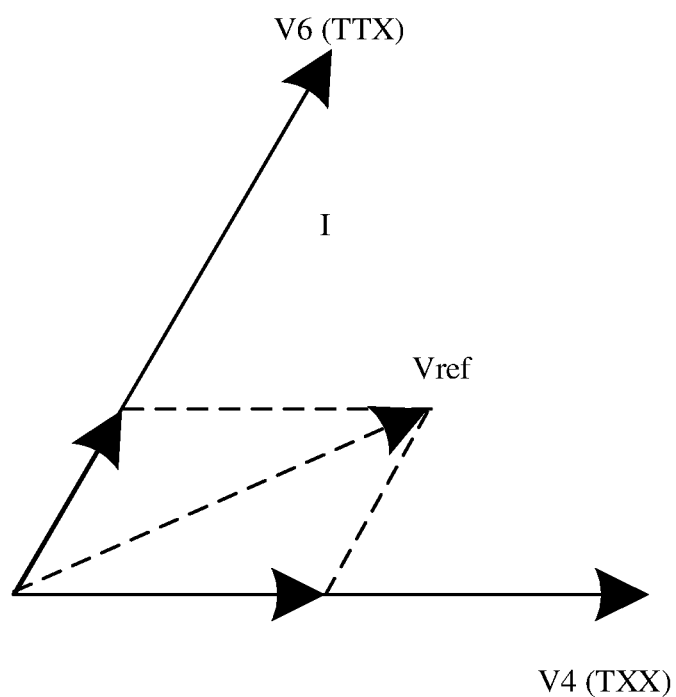
FIG. 14 is a schematic diagram of a process of synthesizing a reference voltage vector based on two-level SVPWM.

W1 and W2 are two basic active vectors corresponding to the sector to which the reference voltage vector $V_{ref}$ belongs, and W3 is a zero vector. For ease of description, as shown in FIG. 14, it is assumed that the reference voltage vector $V_{ref}$ belongs to a sector 3, and vectors corresponding to the sector 3 include a basic voltage vector TXX, a basic voltage vector TTX, and a zero vector. In other words, the basic voltage vector TXX may be used as W1, the basic voltage vector TTX may be used as W2, and the zero vector may be used as W3. Action duration k1 corresponding to W1 and action duration k2 corresponding to W2 satisfy the following relationship:

$$V_\alpha \times TS = |W1| \times k1 + |W2| \times k2 \times \cos 60°$$

$$V_\beta \times TS = |W2| \times k2 \times \sin 60°$$

Herein, $V_\alpha$ is a component of the reference voltage vector $V_{ref}$ on the $\alpha$ axis, and $V_\beta$ is a component of the reference voltage vector $V_{ref}$ on the $\beta$ axis.

Because an amplitude of a non-zero vector is ⅔Vdc, the component of the reference voltage vector $V_{ref}$ on the $\alpha$ axis, the component on the $\beta$ axis, the duration TS of the control period, and the input voltage Vdc of the three-level inverter may be used to represent the action duration k1 corresponding to W1 and the action duration k2 corresponding to W2, as shown in the following.

$$k1 = \frac{\sqrt{3} \times V_\alpha - V_\beta}{2} \times \frac{\sqrt{3} \times TS}{Vdc}$$

$$k2 = V_\beta \times \frac{\sqrt{3} \times TS}{Vdc}$$

Then, after determining k1 and k2, the control circuit may determine action duration k3 of the zero vector. Herein, k3=TS−k1−k2.

After determining action duration corresponding to each vector, the control circuit may determine, in the seven-segment symmetric PWM mode based on the principle that a drive signal of a switch in only one branch in two adjacent segments has a different level (in other words, the principle of switching a switch in only one branch each time), a basic voltage vector corresponding to each vector and action duration corresponding to each basic voltage vector.

That the control circuit generates the drive signal of each switch in the seven-segment symmetric PWM mode is used as an example below. FIG. 14 shows a PWM waveform corresponding to an output state (expected output voltage information) of each branch in one control period. The PWM waveform of the output state of each branch is symmetrical with respect to a middle moment of the control period. One control period may be segmented into seven segments, and a segment 1, a segment 4 (an intermediate segment), and a last segment correspond to zero vectors. Based on a principle that there is a smallest quantity of switching times, the control circuit may determine a basic voltage vector corresponding to each segment and action time of each basic voltage vector in each segment.

Figure 15:
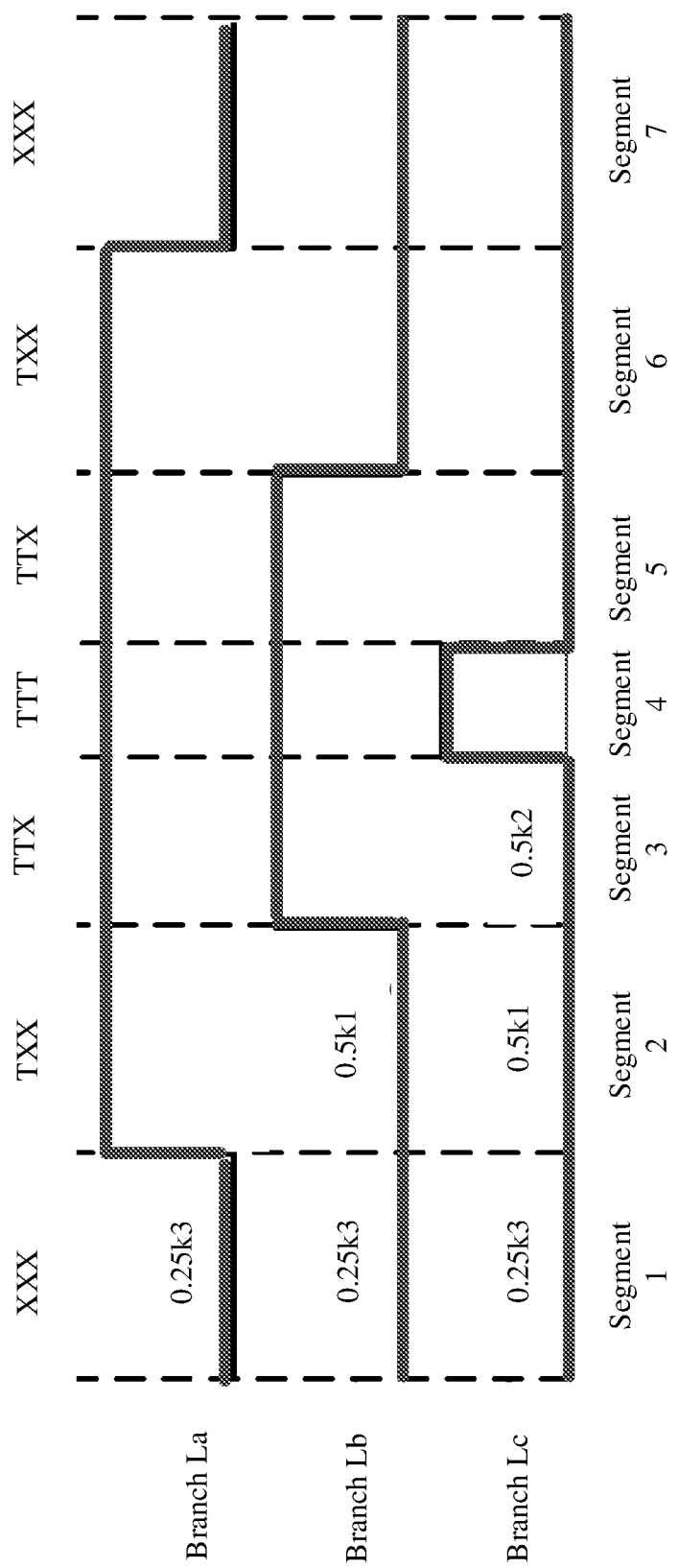
FIG. 15 is a schematic diagram of output states of branches in a three-level inverter.

For example, as shown in FIG. 15, in one control period, a segment 1 corresponds to a basic voltage vector XXX, a segment 2 corresponds to a basic voltage vector TXX, a segment 3 corresponds to a basic voltage vector TTX, a segment 4 corresponds to a basic voltage vector TTT, a segment 5 corresponds to a basic voltage vector TTX, a segment 6 corresponds to a basic voltage vector TXX, and a segment 7 corresponds to a basic voltage vector XXX. Action duration of each branch in the segment 1 is 0.25k3. Duration is 0.25k3 when the output voltage of each branch is −Vdc/2. Action duration of each branch in the segment 2 is 0.5k1. Duration is 0.5k1 when the output voltage of the branch La is +Vdc/2, and duration is 0.5k1 when the output voltage of the branch Lb and the output voltage of the branch Lc is −Vdc/2. Action duration of each branch in the segment 3 is 0.5k2. Duration is 0.5k2 when the output voltage of the branch La and the output voltage of the branch Lb is 0.5k2, and duration is 0.5k2 when the output voltage of the branch Lc is −Vdc/2. Action duration of each branch in the segment 4 may be determined based on the duration of the control period and action duration of another segment. In one control period, the PWM waveform of the output state of each branch is symmetrical with respect to the middle moment of the control period. A state of each branch in the segment 5 is the same as a state of each branch in the segment 3, a state of each branch in the segment 6 is the same as a state of each branch in the segment 2, and a state of each branch in the segment 7 is the same as a state of each branch in the segment 1. Details are not described herein again.

As described above, a switch S1 and a switch S2 in any branch (the third branch) in the branches are in an on state, the switch S3 and the switch S4 are in an off state, and the output voltage of the third branch is +Vdc/2. The switch S3 and the switch S4 in the third branch are in an on state, the switch S1 and the switch S2 are in an off state, and the output voltage of the third branch is −Vdc/2. The control circuit may determine, based on expected output voltage information and action duration of each branch in each segment, a modulation wave corresponding to a switch in each branch. The control circuit may determine a drive signal of each switch in each branch based on a modulation wave and a carrier that correspond to each switch. In this embodiment of this application, in a process in which the control circuit drives the three-level inverter in the mode 2, generated drive signals of the switch S1 and the switch S2 are the same, and generated drive signals of the switch S3 and the switch S4 are the same.

Figure 16:
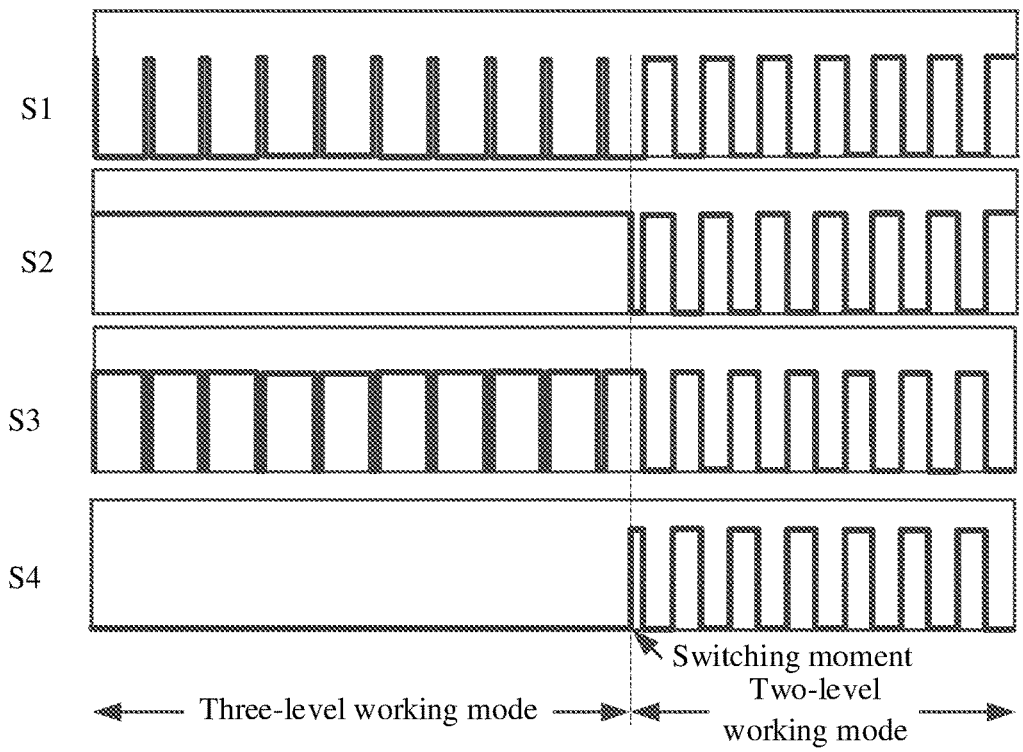
FIG. 16 is a schematic diagram of drive signals of switches before and after switching between two working modes.
Figure 16:
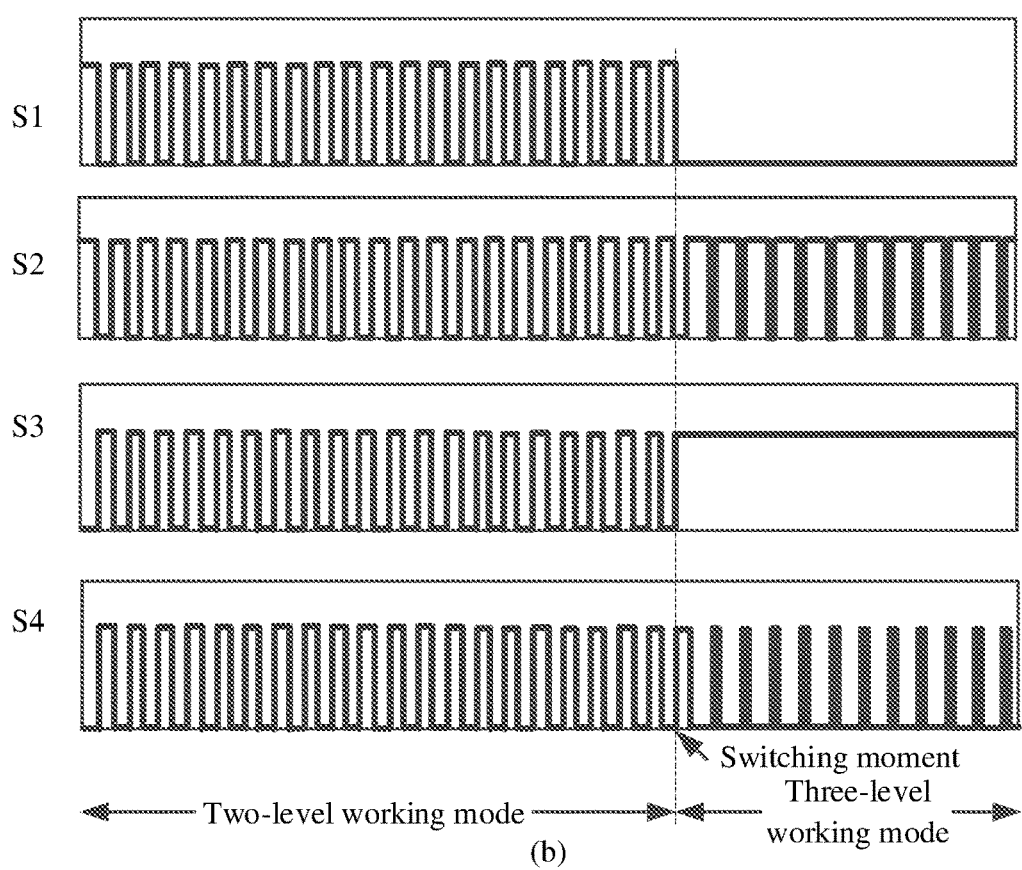

The control circuit may drive each switch in the I-type inverter or the T-type inverter in either of the mode 1 and the mode 2, so that the output voltage of the I-type inverter or the output voltage of the T-type inverter includes two levels. (a) in FIG. 16 is a schematic diagram in which a control circuit switches from a three-level working mode to a two-level working mode to generate a drive signal of each switch. (b) in FIG. 16 is a schematic diagram in which a control circuit switches from a two-level working mode to a three-level working mode to generate a drive signal of each switch. It can be learned, based on the drive signal of each switch in a time period of the two-level working mode in (a) in FIG. 16 and (b) in FIG. 16, that drive signals of the switch S1 and the switch S2 are the same, drive signals of switch S3 and switch S4 are the same, and drive signals of switch S1 and switch S4 have an opposite relationship (or a complementary relationship).

When a three-level inverter in a motor system is the T-type inverter 500, for the process in which the control circuit drives the switch in each branch in the T-type inverter 500 in the mode 1 or the mode 2, refer to the process of driving each switch in the I-type inverter 400. Switches K1, K2, K3, and K4 in each branch in the T-type inverter respectively correspond to switches S1, S2, S3, and S4 in each branch in the I-type inverter 400.

In addition, for the T-type inverter, this application further provides a two-level working mode. The control circuit may drive each switch in the T-type inverter in a manner provided in the following mode 3, so that the output voltage of the T-type inverter includes two levels.

Mode 3

In this mode, the control circuit may drive a switch K2 and a switch K3 in each branch in the T-type inverter 500 to be in an off state. In this case, a switch K1 in each branch may be considered as an upper bridge arm switch of each bridge arm in the three-phase full-bridge inverter, and a switch K4 may be considered as a lower bridge arm switch of each bridge arm in the three-phase full-bridge inverter. The control circuit may generate drive signals of the switch K1 and the switch K4 based on drive signals of the upper bridge arm switch and the lower bridge arm switch in the three-phase full-bridge inverter, and apply the drive signals to the switch K1 and the switch K4 in each branch, so that a voltage output by the T-type inverter 500 includes two levels.

In an example, the control circuit may determine, in an existing SVPWM manner of a three-phase full-bridge inverter, a modulation wave corresponding to the switch K1 in each branch and a modulation wave corresponding to the switch K4. The control circuit may generate a drive signal of the switch K1 based on a modulation wave and a carrier of the switch K1 on each branch, and apply the drive signal to the switch K1, and generate a drive signal of the switch K4 based on a modulation wave and a carrier of the switch K4 in each branch, and apply the drive signal to the switch K4. In addition, the control circuit controls, in this mode, the switch K2 and the switch K3 in each branch to be always in an off state.

Figure 17:
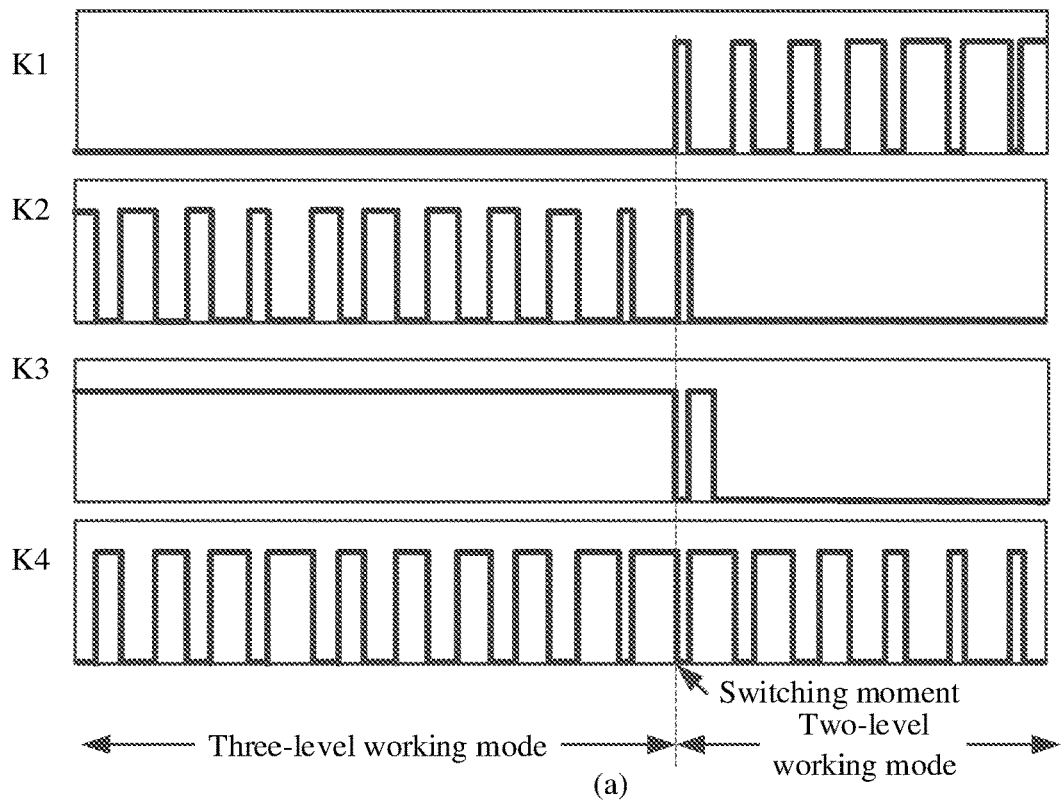
FIG. 17 is a schematic diagram of drive signals of switches before and after switching between a mode 3 and a three-level working mode.
Figure 17:
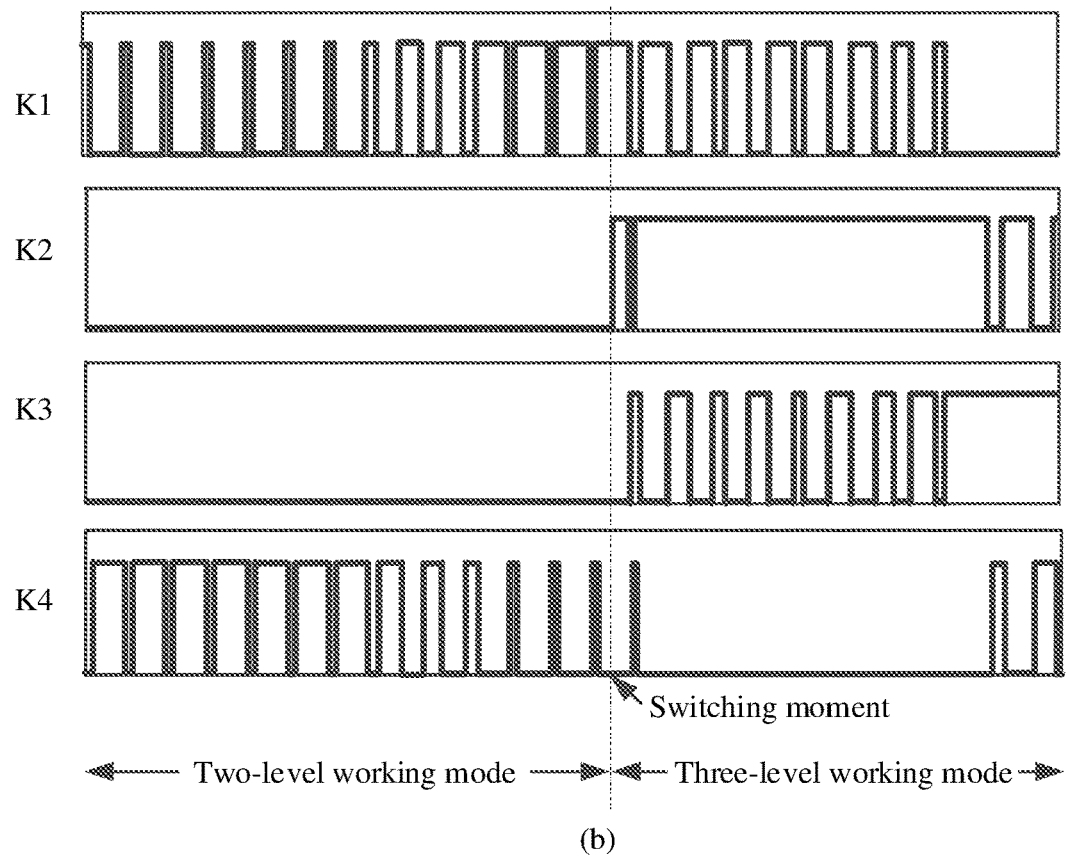

Usually, for a drive signal of each switch in a time period of the two-level working mode shown in (a) in FIG. 17 and (b) in FIG. 17, the control circuit may generate the drive signal of each switch in each branch in a driving manner of each branch provided in the mode 1 or the mode 2. Then, the control circuit applies the generated drive signal of the switch K1 in each branch to the switch K1, and applies the generated drive signal of the switch K4 in each branch to the switch K4, and continuously provides a low-level signal for the switch K2 and the switch K3, so that the switch K2 and the switch K3 remain in an off state.

In another example, in a process in which the control circuit drives each branch in the driving manner of each branch in the mode 1 or the mode 2, the control circuit may control the switch K2 and the switch K3 in each branch to be in an off state. Alternatively, the control circuit may generate a drive signal corresponding to the switch K1 in each branch and a drive signal corresponding to the switch K4 in the mode 1 or mode 2. In addition, the control circuit continuously provides low-level signals to the switch K2 and the switch K3. Such a design may reduce a quantity of switching times and reduce the switching loss.

Figure 18:
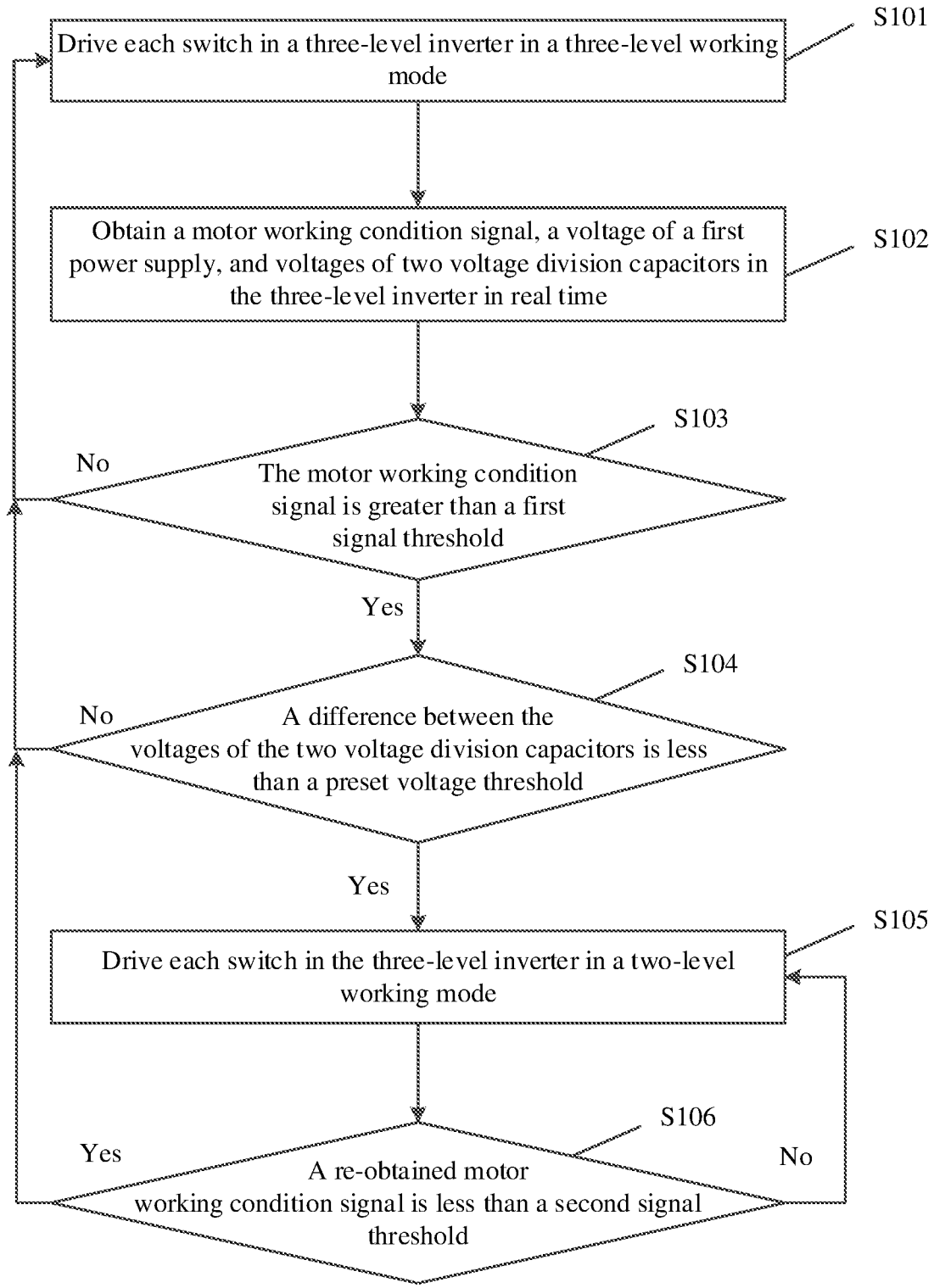
FIG. 18 is a schematic flowchart of a motor driving method.

For ease of understanding a process in which a motor driving apparatus provided in an embodiment of this application drives a motor, FIG. 18 shows a motor driving method. The motor driving method may be implemented or performed by the motor driving apparatus. The motor driving apparatus may include a three-level inverter, and the motor driving apparatus may be separately connected to a first power supply and a motor. The method may include the following steps.

Step S101: Drive each switch in the three-level inverter in a three-level working mode.

The motor driving apparatus may generate a drive signal of each switch in the three-level working mode provided in the foregoing embodiments, and apply the generated drive signal of each switch to the corresponding switch, to drive each switch.

Step S102: Obtain a motor working condition signal, a voltage of the first power supply, and voltages of two voltage division capacitors in the three-level inverter in real time.

The motor working condition signal may be a current value at an input port of one or more phases of the motor, or a rotational speed of the motor, or a torque of the motor.

Step S103: Determine whether the motor working condition signal is greater than a first signal threshold, and perform step S104 if the motor working condition signal is greater than the first signal threshold, or perform step S101 if the motor working condition signal is not greater than the first signal threshold.

If the motor working condition signal is a current value, the signal threshold is a current threshold. Similarly, if the motor working condition signal is a torque of the motor, the signal threshold is a torque threshold.

The motor driving apparatus may determine a fluctuation in a midpoint voltage of the three-level inverter based on the motor working condition signal and the first signal threshold. If the motor working condition signal is less than the first signal threshold, it may be determined that the midpoint voltage of the three-level inverter currently fluctuates slightly, and each switch continues to be driven in the three-level working mode, so that running efficiency of the motor can be maintained at a high level.

Step S104: Determine whether a difference between the voltages of the two voltage division capacitors is less than a preset voltage threshold, and perform step S105 if the difference between the voltages of the two voltage division capacitors is less than the preset voltage threshold, or perform step S101 if the difference between the voltages of the two voltage division capacitors is not less than the preset voltage threshold.

If the motor working condition signal is greater than or equal to the first signal threshold, it may be determined that the midpoint voltage of the three-level inverter fluctuates greatly. The motor driving apparatus may determine the difference between the voltages of the two voltage division capacitors in the three-level inverter, to determine whether to switch the working mode.

Step S105: Drive each switch in the three-level inverter in a two-level working mode.

If the three-level inverter is an I-type inverter, the motor driving apparatus may generate the drive signal of each switch in a mode 1 or a mode 2 in the two-level working mode provided in the foregoing embodiments, and apply the generated drive signal of each switch to the corresponding switch, to drive each switch.

If the three-level inverter is a T-type inverter, the motor driving apparatus may generate the drive signal of each switch in a mode 1, a mode 2, or a mode 3 in the two-level working mode provided in the foregoing embodiments, and apply the generated drive signal of each switch to the corresponding switch, to drive each switch.

Step S106: Determine whether a re-obtained motor working condition signal is less than a second signal threshold, and perform step S101 if the re-obtained motor working condition signal is less than the second signal threshold, or perform step S105 if the re-obtained motor working condition signal is not less than the second signal threshold.

After switching to the two-level working mode to drive each switch, the motor driving apparatus may compare the motor working condition signal obtained in real time and the second signal threshold. In this embodiment of this application, a difference between the second signal threshold and the first signal threshold is a preset value, and the first signal threshold may be greater than the second signal threshold. It can be understood that, in different working modes, the motor driving apparatus compares, with different signal thresholds, the motor working condition signal obtained in real time.

Figure 19:
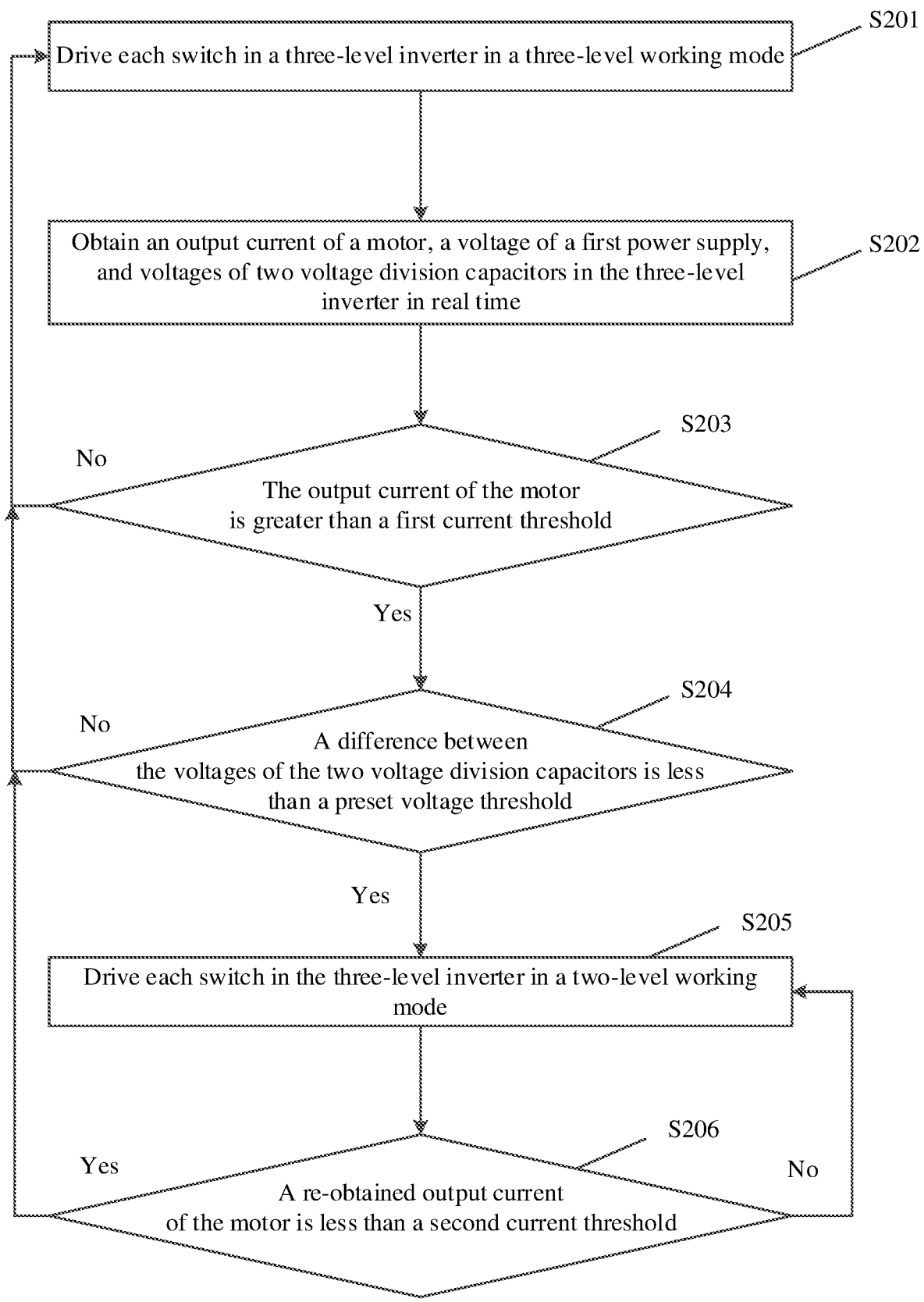
FIG. 19 is a schematic flowchart of another motor driving method.

The following provides descriptions by using an example in which a motor working condition signal is a current at an output port of one or more phases of a motor (a current output by one or more branches in a three-level inverter). FIG. 19 shows a motor driving method. The motor driving method may be implemented or performed by the motor driving apparatus. The motor driving apparatus may include a three-level inverter, and the motor driving apparatus may be separately connected to a first power supply and a motor. The method may include the following steps.

Step S201: Drive each switch in the three-level inverter in a three-level working mode.

The motor driving apparatus may generate a drive signal of each switch in the three-level working mode provided in the foregoing embodiments, and apply the generated drive signal of each switch to the corresponding switch, to drive each switch.

Step S202: Obtain an output current of the motor, a voltage of the first power supply, and voltages of two voltage division capacitors in the three-level inverter in real time.

The output current of the motor may be a current at an input port of any phase, or may be an average value of currents at input ports of a plurality of phases, or a largest value of currents at input ports of a plurality of phases. In this embodiment of this application, the motor driving apparatus uses the output current (an output current of a three-level inverter) of the motor as a quantity representing a fluctuation in a midpoint voltage.

Step S203: Determine whether the output current of the motor is greater than a first current threshold, and perform step S204 if the output current of the motor is greater than the first current threshold, or perform step S201 if the output current of the motor is not greater than the first current threshold.

The motor driving apparatus may determine a fluctuation in a midpoint voltage of the three-level inverter based on the motor working condition signal and the first current threshold. If the motor working condition signal is less than the first current threshold, it may be determined that the midpoint voltage of the three-level inverter currently fluctuates slightly, and each switch continues to be driven in the three-level working mode, so that running efficiency of the motor can be maintained at a high level.

Step S204: Determine whether a difference between the voltages of the two voltage division capacitors is less than a preset voltage threshold, and perform step S205 if the difference between the voltages of the two voltage division capacitors is less than the preset voltage threshold, or perform step S201 if the difference between the voltages of the two voltage division capacitors is not less than the preset voltage threshold.

If the output current of the motor is greater than or equal to the first current threshold, it may be determined that the midpoint voltage of the three-level inverter fluctuates greatly. The motor driving apparatus may determine the difference between the voltages of the two voltage division capacitors in the three-level inverter, to determine whether to switch the working mode.

Step S205: Drive each switch in the three-level inverter in a two-level working mode.

If the three-level inverter is an I-type inverter, the motor driving apparatus may generate the drive signal of each switch in a mode 1 or a mode 2 in the two-level working mode provided in the foregoing embodiments, and apply the generated drive signal of each switch to the corresponding switch, to drive each switch.

If the three-level inverter is a T-type inverter, the motor driving apparatus may generate the drive signal of each switch in a mode 1, a mode 2, or a mode 3 in the two-level working mode provided in the foregoing embodiments, and apply the generated drive signal of each switch to the corresponding switch, to drive each switch.

Step S206: Determine whether a re-obtained output current of the motor is less than a second current threshold, and perform step S201 if the re-obtained output current of the motor is less than the second current threshold, or perform step S205 if the re-obtained output current of the motor is not less than the second current threshold.

After switching to the two-level working mode to drive each switch, the motor driving apparatus may compare the output current that is of the motor and that is obtained in real time and the second current threshold. In this embodiment of this application, a difference between the second current threshold and the first current threshold is a preset value. In different working modes, the motor driving apparatus may compare different current thresholds and the output current that is of the motor and that is obtained in real time.

Figure 20:
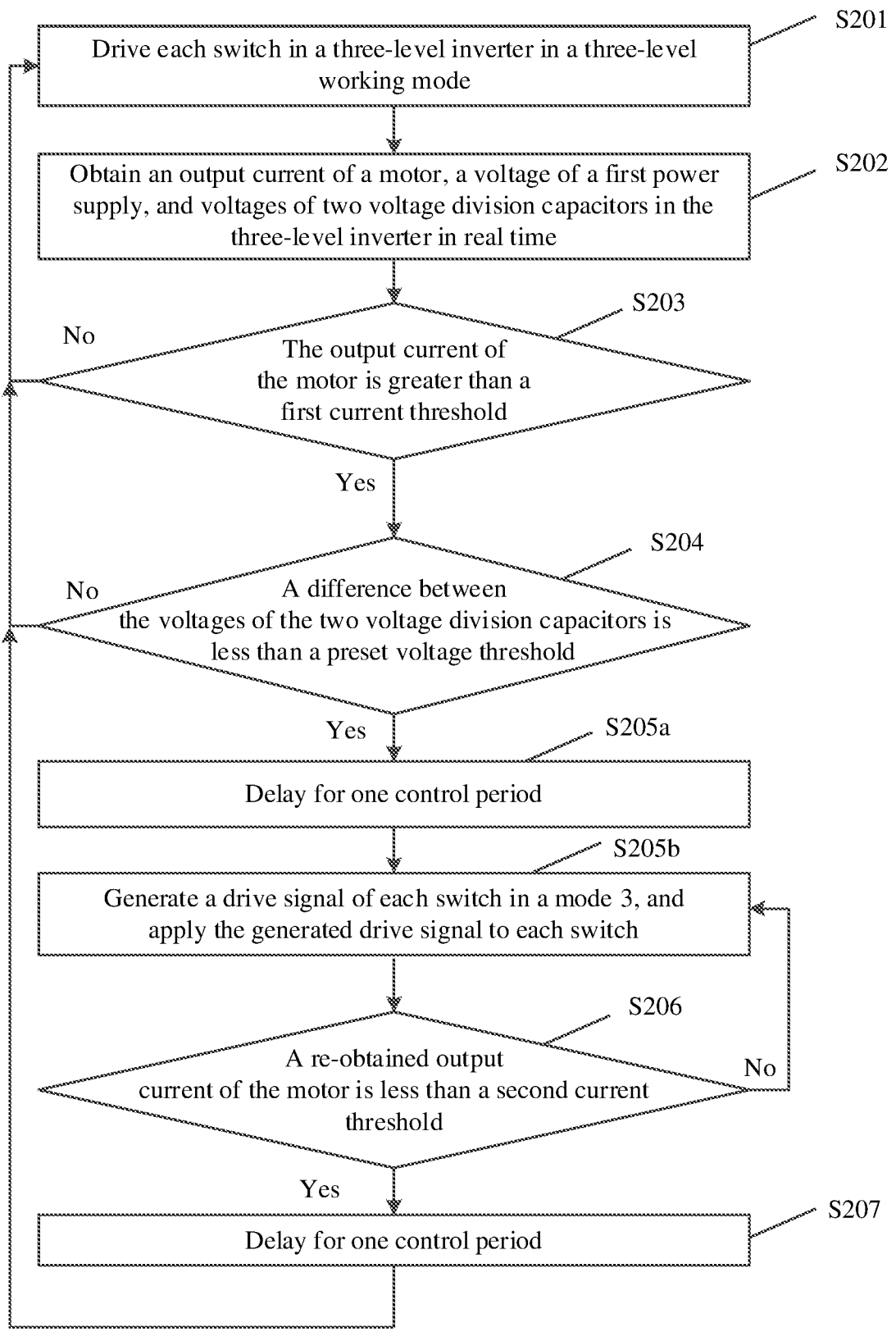
FIG. 20 is a schematic flowchart of still another motor driving method.

In a possible design, if the three-level inverter is a T-type inverter, when performing an action in step S205, the motor driving apparatus may generate the drive signal of each switch in a manner in a mode 3 in the foregoing embodiments, and apply the generated drive signal to each switch after delaying for one control period, as shown in step S205*a* and step S205*b* in FIG. 20. After performing step S206 and before performing step S201, the motor driving apparatus may delay for one control period, as shown in step S207 in FIG. 20.

An embodiment of this application further provides a motor system. The motor system may include any motor driving apparatus, a first power supply, and a motor provided in the foregoing embodiments. The motor driving apparatus is separately connected to the first power supply and the motor, and is configured to: convert a direct current provided by the first power supply into an alternating current, and provide the alternating current for the motor.

An embodiment of this application further provides an electric vehicle. The vehicle may include the motor system provided in the foregoing embodiments.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A motor driving apparatus comprising:
a three-level inverter;
a motor parameter obtaining circuit; and
a control circuit;
wherein the three-level inverter is configured: to be separately connected to a first power supply and a motor, to invert a direct current provided by the first power supply into an alternating current, and to provide the alternating current for the motor;
wherein the motor parameter obtaining circuit is configured: to be separately coupled to the motor and the control circuit, to obtain a motor working condition signal of the motor, and to provide the motor working condition signal for the control circuit; and
wherein the control circuit is configured to perform:
selecting a target working mode from a plurality of working modes based on the motor working condition signal, and
controlling the three-level inverter in the target working mode, so that a midpoint voltage of the three-level inverter is less than a first voltage threshold;
wherein the plurality of working modes comprise at least a first working mode and a second working mode,
wherein the control circuit, during the selecting the target working mode from the plurality of working modes based on the motor working condition signal, performs:
comparing the motor working condition signal and a reference signal threshold;
determining the second working mode as the target working mode in accordance with the motor working condition signal-is being less than the reference signal threshold; and
determining the first working mode as the target working mode in accordance with the motor working condition signal is greater than or equal to the reference signal threshold;
wherein the motor driving apparatus further comprises a capacitor voltage detection circuit that is separately connected to the three-level inverter and the control circuit;
wherein the three-level inverter comprises: a first input port, a second input port, and two voltage division capacitors,
wherein the first input port and the second input port are configured to be connected, respectively, to a positive port and a negative port of the first power supply,
wherein the two voltage division capacitors are connected in series between the first input port and the second input port;
wherein the capacitor voltage detection circuit is configured to perform:
detecting a voltage of each voltage division capacitor, and
providing voltages of the two voltage division capacitors for the control circuit; and
wherein the control circuit is further configured to perform:
controlling, in accordance with a previously determined target working mode-being the second working mode and the target working mode determined at the current time is the first working mode, the three-level inverter in the first working mode in accordance with determining that a difference between voltages of the two voltage division capacitors is less than a second voltage threshold,
wherein the second voltage threshold is less than the first voltage threshold.

2. The motor driving apparatus according to claim 1, wherein the reference signal threshold is one of a first preset signal threshold and a second preset signal threshold,
wherein the first preset signal threshold is greater than the second preset signal threshold,
wherein a difference between the first preset signal threshold and the second preset signal threshold is a preset value; and
wherein the control circuit is further configured to perform:
using, in accordance with a target working mode determined at a current time is the first working mode, the second preset signal threshold as a reference signal threshold for a next comparison with the motor working condition signal obtained by the motor parameter obtaining circuit; and
using, in accordance with a target working mode determined at a current time is the second working mode, the first preset signal threshold as a reference signal threshold for a next comparison with the motor working condition signal obtained by the motor parameter obtaining circuit.

3. The motor driving apparatus according to claim 1, wherein the motor working condition signal is a current at an input port of one or more phases of the motor; and
wherein the motor parameter obtaining circuit comprises a current collection circuit, and
wherein the current collection circuit is configured to be connected to the input port of one or more phases of the motor and to collect the current at the input port of one or more phases of the motor.

4. The motor driving apparatus according to claim 1, wherein the motor working condition signal is a torque parameter of the motor; and
wherein the motor parameter obtaining circuit comprises an instruction receiving circuit that is configured to receive a motor torque instruction that carries the torque parameter of the motor.

5. The motor driving apparatus according to claim 2, wherein the three-level inverter further comprises a plurality of branches, wherein, with regard to the plurality of branches:
each branch is connected to an input port of one phase of the motor,
different branches are connected to different input ports of the motor, and
the control circuit is connected to each branch; and
wherein during the controlling the three-level inverter in the target working mode, in accordance with the target working mode being the first working mode, the control circuit is specifically configured to perform:
determining at least one basic voltage vector from a plurality of basic voltage vectors based on a reference voltage vector, and determining an action time period corresponding to each determined basic voltage vector in a period, wherein the reference voltage vector is determined based on an expected current value of the motor and an output current value of the motor, wherein the basic voltage vector comprises expected output voltage information of each branch, wherein the expected output voltage information is determined based on a voltage of the first power supply, and wherein a voltage corresponding to the expected output voltage information is not zero;
determining, based on each determined basic voltage vector, the expected output voltage information corresponding to each branch in the action time period corresponding to each determined basic voltage vector; and
controlling the branch to provide, for the connected input port of one phase of the motor in the action time period of each determined basic voltage vector in the period, a voltage corresponding to the expected output voltage information corresponding to the branch.

6. The motor driving apparatus according to claim 5, wherein each branch comprises a first switch K1, a second switch K4, a third switch K3, and a fourth switch K2; wherein:
the first switch K1 and the second switch K4 are connected in series between the first input port and the second input port,
the third switch K3 and the fourth switch K2 are connected in series between a first node and a second node,
the first node is a connection point between the first switch K1 and the second switch K4,
the second node is a connection point between the third switch K3 and the fourth switch K2,
the first node is an output port of the branch and is configured to be connected to the input port of one phase of the motor,
different branches are connected to different input ports of the motor, and
the control circuit is connected to each switch comprised in each branch; and
wherein during the control circuit controlling the three-level inverter in the target working mode, in accordance with the target working mode is the first working mode, the third switch K3 and the fourth switch K2 are controlled to be in an off state.

7. The motor driving apparatus according to claim 5, wherein in accordance with the target working mode being the first working mode, an output port of each branch is not connected to a connection point between the two voltage division capacitors while the three-level inverter operates in the first working mode; and
wherein in accordance with the target working mode being the second working mode, a voltage output by the output port of each branch while the three-level inverter operates in the second working mode is one of three preset voltages, wherein the three preset voltages are: a first voltage +Vdc/2, a second voltage −Vdc/2, and 0, and
wherein Vdc is a voltage of the first power supply.

8. The motor driving apparatus according to claim 5, further comprising a power supply voltage detection circuit that is:
configured to be connected to the first power supply and the control circuit, and configured to perform:
detecting the voltage Vdc of the first power supply, and
providing the voltage Vdc of the first power supply for the control circuit, so that the control circuit determines the expected output voltage information of each branch.

9. A motor system, comprising:
a first power supply; and
a motor; and
a motor driving apparatus comprising:
a three-level inverter;
a motor parameter obtaining circuit; and
a control circuit;
wherein the three-level inverter is configured: to be separately connected to the first power supply and the motor, to invert a direct current provided by the first power supply into an alternating current, and to provide the alternating current for the motor;
wherein the motor parameter obtaining circuit is configured: to be separately coupled to the motor and the control circuit, to obtain a motor working condition signal of the motor, and to provide the motor working condition signal for the control circuit; and
wherein the control circuit is configured to perform:
selecting a target working mode from a plurality of working modes based on the motor working condition signal, and
controlling the three-level inverter in the target working mode, so that a midpoint voltage of the three-level inverter is less than a first voltage threshold;
wherein the motor driving apparatus is:
separately connected to the first power supply and the motor, and
configured to convert a direct current provided by the first power supply into an alternating current and provide the alternating current for the motor;
wherein the plurality of working modes comprise at least a first working mode and a second working mode,
wherein the control circuit, during the selecting the target working mode from the plurality of working modes based on the motor working condition signal, performs:
comparing the motor working condition signal and a reference signal threshold;
determining the second working mode as the target working mode in accordance with the motor working condition signal-is being less than the reference signal threshold; and
determining the first working mode as the target working mode in accordance with the motor working condition signal is greater than or equal to the reference signal threshold;
wherein the motor driving apparatus further comprises a capacitor voltage detection circuit that is separately connected to the three-level inverter and the control circuit;
wherein the three-level inverter comprises: a first input port, a second input port, and two voltage division capacitors,
wherein the first input port and the second input port are configured to be connected, respectively, to a positive port and a negative port of the first power supply,
wherein the two voltage division capacitors are connected in series between the first input port and the second input port;
wherein the capacitor voltage detection circuit is configured to perform:
detecting a voltage of each voltage division capacitor, and
providing voltages of the two voltage division capacitors for the control circuit; and
wherein the control circuit is further configured to perform:
controlling, in accordance with a previously determined target working mode-being the second working mode and the target working mode determined at the current time is the first working mode, the three-level inverter in the first working mode in accordance with determining that a difference between voltages of the two voltage division capacitors is less than a second voltage threshold,
wherein the second voltage threshold is less than the first voltage threshold.

10. The motor system according to claim 9, wherein the reference signal threshold is one of a first preset signal threshold and a second preset signal threshold,
wherein the first preset signal threshold is greater than the second preset signal threshold, wherein a difference between the first preset signal threshold and the second preset signal threshold is a preset value; and wherein the control circuit is further configured to perform:
using, in accordance with a target working mode determined at a current time is the first working mode, the second preset signal threshold as a reference signal threshold for a next comparison with the motor working condition signal obtained by the motor parameter obtaining circuit; and
using, in accordance with a target working mode determined at a current time is the second working mode, the first preset signal threshold as a reference signal threshold for a next comparison with the motor working condition signal obtained by the motor parameter obtaining circuit.

11. The motor system according to claim 9, wherein the motor working condition signal is a current at an input port of one or more phases of the motor; and
wherein the motor parameter obtaining circuit comprises a current collection circuit, and
wherein the current collection circuit is configured to be connected to the input port of one or more phases of the motor and to collect the current at the input port of one or more phases of the motor.

12. The motor system according to claim 9, wherein the motor working condition signal is a torque parameter of the motor; and
wherein the motor parameter obtaining circuit comprises an instruction receiving circuit that is configured to receive a motor torque instruction that carries the torque parameter of the motor.

13. The motor system according to claim 10, wherein the three-level inverter further comprises a plurality of branches, wherein, with regard to the plurality of branches:
each branch is connected to an input port of one phase of the motor,
different branches are connected to different input ports of the motor, and
the control circuit is connected to each branch; and
wherein during the controlling the three-level inverter in the target working mode, in accordance with the target working mode being the first working mode, the control circuit is specifically configured to perform:
determining at least one basic voltage vector from a plurality of basic voltage vectors based on a reference voltage vector, and determining an action time period corresponding to each determined basic voltage vector in a period, wherein the reference voltage vector is determined based on an expected current value of the motor and an output current value of the motor, wherein the basic voltage vector comprises expected output voltage information of each branch, wherein the expected output voltage information is determined based on a voltage of the first power supply, and wherein a voltage corresponding to the expected output voltage information is not zero;
determining, based on each determined basic voltage vector, the expected output voltage information corresponding to each branch in the action time period corresponding to each determined basic voltage vector; and
controlling the branch to provide, for the connected input port of one phase of the motor in the action time period of each determined basic voltage vector in the period, a voltage corresponding to the expected output voltage information corresponding to the branch.

14. The motor system according to claim 13, wherein each branch comprises a first switch K1, a second switch K4, a third switch K3, and a fourth switch K2;
wherein:
the first switch K1 and the second switch K4 are connected in series between the first input port and the second input port,
the third switch K3 and the fourth switch K2 are connected in series between a first node and a second node,
the first node is a connection point between the first switch K1 and the second switch K4,
the second node is a connection point between the third switch K3 and the fourth switch K2,
the first node is an output port of the branch and is configured to be connected to the input port of one phase of the motor,
different branches are connected to different input ports of the motor, and
the control circuit is connected to each switch comprised in each branch; and
wherein during the control circuit controlling the three-level inverter in the target working mode, in accordance with the target working mode is the first working mode, the third switch K3 and the fourth switch K2 are controlled to be in an off state.

15. The motor system according to claim 13, wherein the motor driving apparatus further comprises a power supply voltage detection circuit that is:
configured to be connected to the first power supply and the control circuit, and
configured to perform:
detecting the voltage Vdc of the first power supply, and
providing the voltage Vdc of the first power supply for the control circuit, so that the control circuit determines the expected output voltage information of each branch.

16. The motor system according to claim 13, wherein in accordance with the target working mode being the first working mode, an output port of each branch is not connected to a connection point between the two voltage division capacitors while the three-level inverter operates in the first working mode; and
wherein in accordance with the target working mode being the second working mode, a voltage output by the output port of each branch while the three-level inverter operates in the second working mode is one of three preset voltages, wherein the three preset voltages are: a first voltage +Vdc/2, a second voltage −Vdc/2, and 0, and
wherein Vdc is a voltage of the first power supply.

17. An electric vehicle comprising a motor system, wherein the motor system comprises:
a first power supply; and
a motor; and
a motor driving apparatus comprising:
a three-level inverter;
a motor parameter obtaining circuit; and
a control circuit;
wherein the three-level inverter is configured: to be separately connected to the first power supply and the motor, to invert a direct current provided by the first power supply into an alternating current, and to provide the alternating current for the motor;

wherein the motor parameter obtaining circuit is configured: to be separately coupled to the motor and the control circuit, to obtain a motor working condition signal of the motor, and to provide the motor working condition signal for the control circuit; and wherein the control circuit is configured to perform:
selecting a target working mode from a plurality of working modes based on the motor working condition signal, and
controlling the three-level inverter in the target working mode, so that a midpoint voltage of the three-level inverter is less than a first voltage threshold;

wherein the motor driving apparatus is:
separately connected to the first power supply and the motor, and
configured to convert a direct current provided by the first power supply into an alternating current and provide the alternating current for the motor;

wherein the plurality of working modes comprise at least a first working mode and a second working mode, wherein the control circuit, during the selecting the target working mode from the plurality of working modes based on the motor working condition signal, performs:
comparing the motor working condition signal and a reference signal threshold;
determining the second working mode as the target working mode in accordance with the motor working condition signal-is being less than the reference signal threshold; and
determining the first working mode as the target working mode in accordance with the motor working condition signal is greater than or equal to the reference signal threshold;

wherein the motor driving apparatus further comprises a capacitor voltage detection circuit that is separately connected to the three-level inverter and the control circuit;

wherein the three-level inverter comprises: a first input port, a second input port, and two voltage division capacitors, wherein the first input port and the second input port are configured to be connected, respectively, to a positive port and a negative port of the first power supply, wherein the two voltage division capacitors are connected in series between the first input port and the second input port;

wherein the capacitor voltage detection circuit is configured to perform:
detecting a voltage of each voltage division capacitor, and
providing voltages of the two voltage division capacitors for the control circuit; and wherein the control circuit is further configured to perform:
controlling, in accordance with a previously determined target working mode-being the second working mode and the target working mode determined at the current time is the first working mode, the three-level inverter in the first working mode in accordance with determining that a difference between voltages of the two voltage division capacitors is less than a second voltage threshold, wherein the second voltage threshold is less than the first voltage threshold.

18. The electric vehicle according to claim 17, wherein the reference signal threshold is one of a first preset signal threshold and a second preset signal threshold,
wherein the first preset signal threshold is greater than the second preset signal threshold,
wherein a difference between the first preset signal threshold and the second preset signal threshold is a preset value; and
wherein the control circuit is further configured to perform:
using, in accordance with a target working mode determined at a current time is the first working mode, the second preset signal threshold as a reference signal threshold for a next comparison with the motor working condition signal obtained by the motor parameter obtaining circuit; and
using, in accordance with a target working mode determined at a current time is the second working mode, the first preset signal threshold as a reference signal threshold for a next comparison with the motor working condition signal obtained by the motor parameter obtaining circuit.

19. The electric vehicle according to claim 17, wherein the motor working condition signal is a current at an input port of one or more phases of the motor; and
wherein the motor parameter obtaining circuit comprises a current collection circuit, and
wherein the current collection circuit is configured to be connected to the input port of one or more phases of the motor and to collect the current at the input port of one or more phases of the motor.

20. The electric vehicle according to claim 17, wherein the motor working condition signal is a torque parameter of the motor; and
wherein the motor parameter obtaining circuit comprises an instruction receiving circuit that is configured to receive a motor torque instruction that carries the torque parameter of the motor.

21. The electric vehicle according to claim 18, wherein the three-level inverter further comprises a plurality of branches, wherein, with regard to the plurality of branches:
each branch is connected to an input port of one phase of the motor,
different branches are connected to different input ports of the motor, and
the control circuit is connected to each branch; and
wherein during the controlling the three-level inverter in the target working mode, in accordance with the target working mode being the first working mode, the control circuit is specifically configured to perform:
determining at least one basic voltage vector from a plurality of basic voltage vectors based on a reference voltage vector, and determining an action time period corresponding to each determined basic voltage vector in a period, wherein the reference voltage vector is determined based on an expected current value of the motor and an output current value of the motor, wherein the basic voltage vector comprises expected output voltage information of each branch, wherein the expected output voltage information is determined based on a voltage of the first power supply, and wherein a voltage corresponding to the expected output voltage information is not zero;
determining, based on each determined basic voltage vector, the expected output voltage information corresponding to each branch in the action time period corresponding to each determined basic voltage vector; and controlling the branch to provide, for the connected input port of one phase of the motor in the action time period of each determined basic voltage vector in the period, a voltage corresponding to the expected output voltage information corresponding to the branch.

* * * * *